(12) United States Patent
Nagata

(10) Patent No.: US 8,717,385 B2
(45) Date of Patent: May 6, 2014

(54) IMAGE DISPLAY CONTROL APPARATUS

(75) Inventor: Mitsutoshi Nagata, Obu (JP)

(73) Assignee: DENSO CORPORATION, Kariya (JP)

( * ) Notice: Subject to any disclaimer, the term of this patent is extended or adjusted under 35 U.S.C. 154(b) by 556 days.

(21) Appl. No.: 12/975,446

(22) Filed: Dec. 22, 2010

(65) Prior Publication Data

US 2011/0157474 A1 Jun. 30, 2011

(30) Foreign Application Priority Data

Dec. 24, 2009 (JP) ................................ 2009-292848

(51) Int. Cl.
*G09G 5/00* (2006.01)
*G09G 5/14* (2006.01)
*H04N 5/445* (2011.01)

(52) U.S. Cl.
CPC .............. G09G 5/14 (2013.01); *H04N 5/44504* (2013.01)
USPC .............................. 345/629; 345/634; 345/684

(58) Field of Classification Search
CPC .............................. G09G 5/14; H04N 5/44504
USPC .......................................... 345/629, 634, 684
See application file for complete search history.

(56) References Cited

U.S. PATENT DOCUMENTS

| | | | |
|---|---|---|---|
| 5,687,306 A * | 11/1997 | Blank | 345/634 |
| 5,973,676 A | 10/1999 | Kawakura | |
| 6,668,080 B1 * | 12/2003 | Torr et al. | 382/173 |
| 7,113,185 B2 * | 9/2006 | Jojic et al. | 345/420 |
| 2007/0217002 A1 | 9/2007 | Fukue | |
| 2010/0045691 A1 | 2/2010 | Naito et al. | |
| 2010/0066762 A1 * | 3/2010 | Yeh et al. | 345/629 |

FOREIGN PATENT DOCUMENTS

| | | |
|---|---|---|
| JP | H08-314430 A | 11/1996 |
| JP | 09-266551 A | 10/1997 |
| JP | 2005-275036 A | 10/2005 |
| JP | 2008-26450 A | 2/2008 |
| JP | 2009-282307 A | 12/2009 |

OTHER PUBLICATIONS

OA Mailed Sep. 17, 2013 in the corresponding JP application No. 2009-292848 (English translation).

* cited by examiner

*Primary Examiner* — David T Welch
(74) *Attorney, Agent, or Firm* — Posz Law Group, PLC

(57) ABSTRACT

An image display control apparatus is disclosed. The image display control apparatus stores first layers for original image data in first planes, combines the first layers into the original image data, records the original image data in an addition plane, and stores second layers for replacement image data in second planes. The second layers in the second planes and the original image data in the addition plane are respectively, synchronously and cyclically inputted to a compositing circuit so that the compositing circuit combines the second set of layers into the replacement image data. In the synchronous and cyclical input, the display of the display device is switched from the original image data to the replacement image data while a manner of combining the original image data and the replacement image data is being gradually changed between consecutive frames.

9 Claims, 15 Drawing Sheets

IMAGE DISPLAY CONTROL APPARATUS

CROSS REFERENCE TO RELATED APPLICATION

The present application is based on and claims priority to Japanese Patent Application No. 2009-292848 filed on Dec. 24, 2009, disclosure of which is incorporated herein by reference.

BACKGROUND OF THE INVENTION

1. Field of the Invention

The present invention relates to an image display control apparatus.

2. Description of Related Art

A known image display control apparatus uses a multi-layer compositing technique to display a single image sheet on a display device (see Patent Documents 1 to 3). More specifically, multiple planes (memory area) are prepared. Data of multiple image sheets (called also layers) are respectively stored in the multiple planes. The stored multiple layers are combined into data of a single image sheet by a plane compositing device. The data of the single image sheet is outputted to the display device, and the single image sheet is displayed on the display device.

Patent Document 1: JP-2008-26450A
Patent Document 2: JP-H9-266551A
Patent Document 3: JP-H7-73278A corresponding to U.S. Pat. No. 5,973,676

In connection with an image display control apparatus utilizing such a multi-layer compositing technique, the inventor of the present application has studied smooth switch of display from one scene to another scene. Discussion will be given below on the smooth switch. Now, examples of the smooth switch are crossfade (called also overlap) and resize. In the crossfade, as shown in FIG. 9, a blend ratio (e.g., display opacity) of an original image 45 is gradually decreased, and a blend ratio of a replacement image 46 is gradually increased. In this manner, the display is changed from the original image 45 to the replacement image 46 via a blend image 47. In the resize, as shown in FIG. 10, an area of the original image 45 on the display screen is gradually decreased and narrowed while an area of the replacement image 46 on the display screen is gradually increased and widened. In this manner, the display is changed from the original image 45 to the replacement image 46 via multiple horizontally-partitioned images 48 and 49.

The above-described smooth switch requires that, for every frame during the smooth switch, N layers for original image data should be generated and stored in the planes and K layers for replacement image data should be generated and stored in the planes. Because of this, processing load and memory band load are disadvantageously huge. Furthermore, if the number of layers (N+K) exceeds the number of planes, it is not possible to combine all of N+K layers into composite image data by using the plane compositing device, and thus, it is necessary to generate in advance a composite layer without using the plane compositing device. As a result, the processing load is further increased.

In connection with the image display control apparatus utilizing the multi-layer compositing technique, the inventor of the present application has also studied display scrolling. Discussion will be given below on the display scrolling. Suppose that a composite image made from multiple layers is scrolled. In this case, every time display position is changed by the scrolling, it is necessary to newly generate layers and store the layers in the planes. Therefore, the processing load and the memory band load are disadvantageously increased.

In addition, for various reasons, the plane compositing device may be reset for a short period of time during display of an image. In this case, the plane compositing device provides an abnormal output; as a result, an abnormal image or nothing is displayed on the display device for the short period. A user may see the abnormal display and may get an idea that the display device is in trouble.

SUMMARY OF THE INVENTION

The present invention is made in view of the foregoing.

It is a first objective of the present invention to provide an image display control apparatus utilizing a multi-layer compositing technique, the image display control apparatus being capable reducing processing load and memory band load in smoothly switching display from one scene to another scene.

It is a second objective of the present invention to provide an image control display apparatus utilizing a multi-layer compositing technique, the image control display apparatus being capable of scrolling an image while decreasing processing load and memory band load.

It is a third objective of the present invention to provide an image display control apparatus utilizing a multi-layer compositing technique, the image display control apparatus being capable of decreasing a possibility that, at a time of reset of a compositing device, a user gets an idea that the display device is in trouble.

According to a first aspect of the present invention, an image display control apparatus including a computation circuit, a storage medium and a plane compositing device is provided. The plane compositing device is to combine a plurality of layers into composite image data on an as-needed basis, and configured to output the composite image data as display image data to a display device. The plurality of layers is generated by the computation circuit. The storage medium includes a plurality of planes respectively configured to temporality retain therein the plurality of layers, the plurality of planes being a portion of a memory area of the storage medium. The plane compositing device includes a plurality of interface units and a compositing circuit. The plurality of interface units is respectively, configured to output the plurality of layers stored in the plurality of planes, which respectively corresponds to the plurality of interface units, to the compositing circuit. The compositing circuit is configured to (i) combine the plurality of layers outputted from the plurality of interface units, thereby generating the composite image data, and (ii) output the composite image data as the display image data to the display device. In addition to the plurality of planes, the storage medium further includes an addition plane configured to retain therein the composite image data outputted from the compositing circuit, the addition plane being another portion of the memory area of the storage medium. The image display control apparatus further includes a loop-back circuit configured to output the composite image data stored in the addition plane to the compositing circuit. The computation circuit is configured to control the storage medium, the plane compositing device and the loop-back circuit when display of the display device is switched, in such manner that: the computation circuit stores a first set of layers for original image data in a first set of planes, the first set of planes being two or more planes of the plurality of planes; the computation circuit causes the compositing circuit to combine the first set of layers together, thereby generating the original image data; the computation circuit records the original image data in the addition plane; the computation circuit then stores a second set of layers for replacement image data in a second set of planes the second set of planes being two or more planes of the plurality of planes; the computation circuit controls the plurality of interface units and the loop-back circuit so that the second set of layers in the second set of planes and the original image data in the addition plane are respectively, synchronously and cyclically inputted from the plurality of interface units and the loop-back circuit to the compositing circuit, and the computation circuit controls the compositing circuit so that the compositing circuit combines the second set of layers into the replacement image data; and when the second set of layers in the second set of planes and the original image data in the addition plane are synchronously and cyclically inputted to the compositing circuit, the computation circuit controls the compositing circuit so that the display of the display device is switched from the original image data to the replacement image data while a manner of combining the original image data and the replacement image data is being gradually changed between consecutive frames.

According to the above image display control apparatus, when the display is switched, the original image data made by the image composition can be recorded in the addition plane and can be re-inputted to the compositing circuit via the loop-back circuit. Thus, because of a loop-back of the original image data, it is possible to eliminate the need to again combine the first set of layers into the original image. As a result, because at least part of the plurality of planes is available, it is possible to make a complicated replacement image from multiple layers by using the available planes. Multiple frames (e.g., 120 frames for two seconds) are required in the display switching. However, the number of time the layer in each plane is read can be only two times during the display switching. A first time is when the layer for the original image data is read. A second time is when the layer for the replacement image data is read. Theretofore, during a loop-output of the original image data and the second set of layers for the replacement image data, contents of the planes are unchanged as being the layers for the replacement image data. Therefore, it is possible to reduce memory band load. Furthermore, because the computation circuit needs not generate another image for display switching, it is possible to reduce processing load of the computation circuit.

According to a second aspect of the present invention, an image display control apparatus including a computation circuit, a storage medium and a plane compositing device is provided. The plane compositing device is to combine a plurality of layers into composite image data on an as-needed basis, and configured to output the composite image data as display image data to a display device. The plurality of layers is generated by the computation circuit. The storage medium includes a plurality of planes respectively configured to temporality retain therein the plurality of layers, the plurality of planes being a portion of a memory area of the storage medium. The plane compositing device includes a plurality of interface units and a compositing circuit. The plurality of interface units is respectively configured to output the plurality of layers stored in the plurality of planes, which respectively corresponds to the plurality of interface units, to the compositing circuit. The compositing circuit is configured to (i) combine the plurality of layers outputted from the plurality of interface units, thereby generating the composite image data, and (ii) output the composite image data as the display image data to the display device. In addition to the plurality of planes, the storage medium further includes an addition plane configured to retain therein the composite image data outputted from the compositing circuit, the addition plane being another portion of the memory area of the storage medium.

The image display control apparatus further includes a loop-back circuit configured to output the composite image data stored in the addition plane to the compositing circuit. The computation circuit is configured to control the storage medium, the plane compositing device and the loop-back circuit when display of the display device is scrolled, in such manner that: the computation circuit stores a first set of layers for original image data in a first set of planes, the first set of planes being two or more planes of the plurality of planes; the computation circuit causes the compositing circuit to combine the first set of layers together, thereby generating the original image data; the computation circuit records the original image data in the addition plane; the computation circuit controls the loop-back circuit so that the loop-back circuit synchronously and cyclically inputs the original image data in the addition plane to the compositing circuit; and during a synchronous and cyclical input of the original image data to the compositing circuit from the loop-back circuit, the computation circuit changes a read address of the original image data recorded in the addition plane in response to user scroll operation, thereby scrolling display of the original image data on the display device in a overscan mode.

According to the above image display control apparatus, the computation circuit can be free from, in response to every scroll operation, generating and storing a new image in the plane. Thus, it is possible to reduce the memory band load of the storage medium and the processing load of the computation circuit.

The above image display control apparatus may be configured in the following way. The computation circuit is further configured to control the storage medium, the plane compositing device and the loop-back circuit so that: during the synchronous and cyclical input of the original image data to the compositing circuit from the loop-back circuit, the computation circuit prospectively stores a second set of layers, for new image data in a second set of planes, the second set of planes being at least one of the plurality of planes, the new image, data being different in display content from the original image data in that the display content of the new image data is slid relative to that of the original image data; before the display of the display device is scrolled beyond the display content of the original image data, the compositing circuit combines the second set of layers into the new image data, and the loop-back circuit records the new image data in the addition plane, and the loop-back circuit cyclically inputs the new image data, stored in the addition plane, to the compositing circuit; and during a cyclical input of the new image data from the loop-back circuit to the compositing circuit, the computation circuit changes a read address of the new image data recorded in the addition plane in response to the user scroll operation, thereby scrolling the display of the new image data on the display device in the overscan mode.

According to the above configuration, the second set of layers, which are prospectively stored in the set of planes during the scroll of the original image data, can be combined into the new image data by the compositing circuit. Therefore, it is possible to promptly continue a scroll operation.

According to a third aspect of the present invention, an image display control apparatus including a computation circuit, a storage medium and a plane compositing device is provided. The plane compositing device is to combine a plurality of layers into composite image data on an as-needed basis, and configured to output the composite image data as display image data to a display device. The plurality of layers is generated by the computation circuit. The storage medium includes a plurality of planes respectively configured to temporality retain therein the plurality of layers, the plurality of planes being a portion of a memory area of the storage medium. The plane compositing device includes a plurality of interface units and a compositing circuit. The plurality of interface units is respectively configured to output the plurality of, layers stored in the plurality of planes, which respectively corresponds to the plurality of interface units, to the compositing circuit. The compositing circuit is configured to (i) combine the plurality of layers outputted from the plurality of interface units, thereby generating the composite image data, and (ii) output the composite image data as the display image data to the display device. In addition to the plurality of planes, the storage medium further includes an addition plane configured to retain therein the composite image data outputted from the compositing circuit, the addition plane being another portion of the memory area of the storage medium. The image display control apparatus further includes a loop-back circuit configured to output the composite image data stored in the addition plane to the compositing circuit. The computation circuit is configured to control the storage medium, the plane compositing device and the loop-back circuit so that: before the plane compositing device is reset, (i) the composite image data outputted from the compositing circuit is recorded as reset-time image data in the addition plane, and then (ii) the loop-back circuit starts cyclically outputting the reset-time image data, and (iii) the compositing circuit outputs, to the display device, the reset-time image data from the loop-back circuit; and the computation circuit then resets the plane compositing device.

According to the above image display control apparatus, the compositing circuit can be switched just before the reset of the plane compositing device, so that a signal from the loop-back circuit is outputted to the display device. Thus, signals from the interface units are prohibited from being inputted to the display device. Then, during the reset, the loop-back circuit cyclically reads the reset-time image data from the addition plane and outputs the reset-time image data to the compositing circuit. For this reason, the compositing circuit can cyclically output the reset-time image data to the display device. The display device can continue to display the reset-time image data during the rest of the plane compositing device. Because the reset-time image data is outputted to the display device before the reset, a user perceives that the display device constitutes to display an already-displayed image during the reset of the plane compositing device. Therefore, it is unlikely that a user has a feeling of strangeness by seeing the display device, it is possible to reduce a possibility that a user gets an idea that the display device is in trouble.

The above image display control apparatus may be configured to further include: a video capture device configured to receive an input of a video signal from a video output device, and configured to output video image data based on the video signal. The loop-output circuit is a component of the video capture device and is further configured to output the video image data, which is based on the video signal received by the video capture device, to the plane compositing device.

According to the above configuration, at the display switching or scrolling, the original image data made by the compositing circuit and recorded in the addition plane can be inputted again to the compositing circuit from the video capture device. That is, the original image data can be loop-backed by utilizing the available video capture device. Therefore, the need to combine the layers into the original image data can be eliminated. Effective use of the available video capture device 10 is possible. At the reset, effective use of the available video capture device 10 is also possible.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF EMBODIMENTS

Embodiments of the present invention will be described below.

First Embodiment

Figure 1:
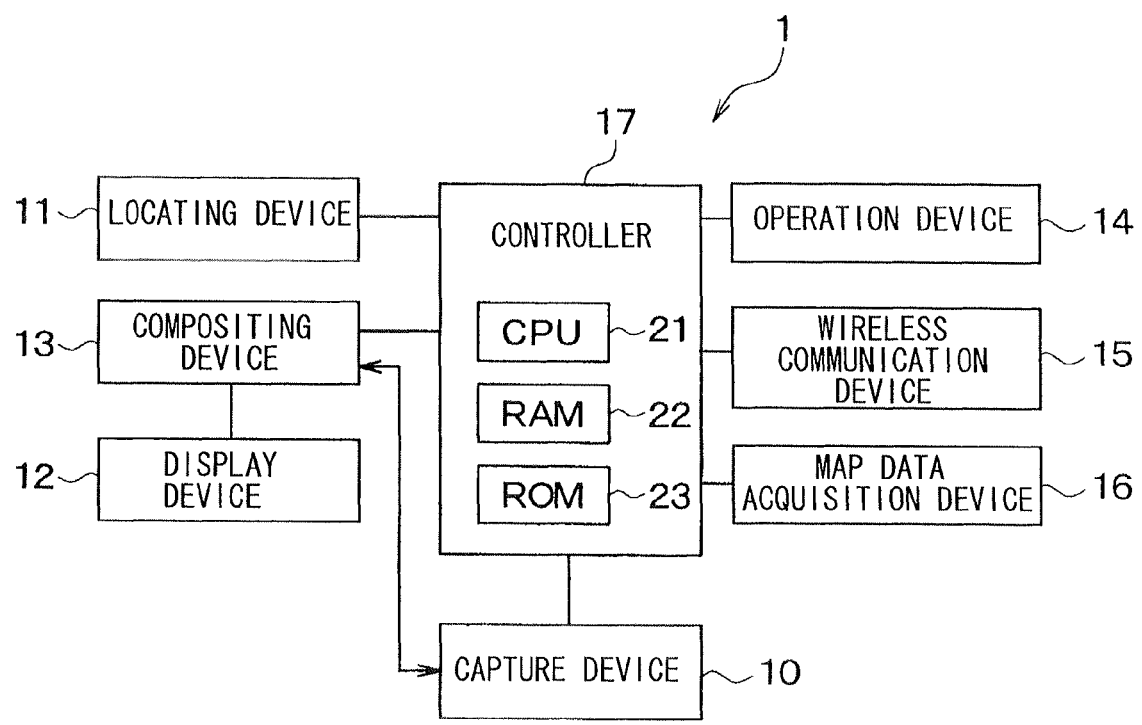
FIG. 1 is a diagram illustrating a navigation apparatus for a vehicle.
Figure 2:
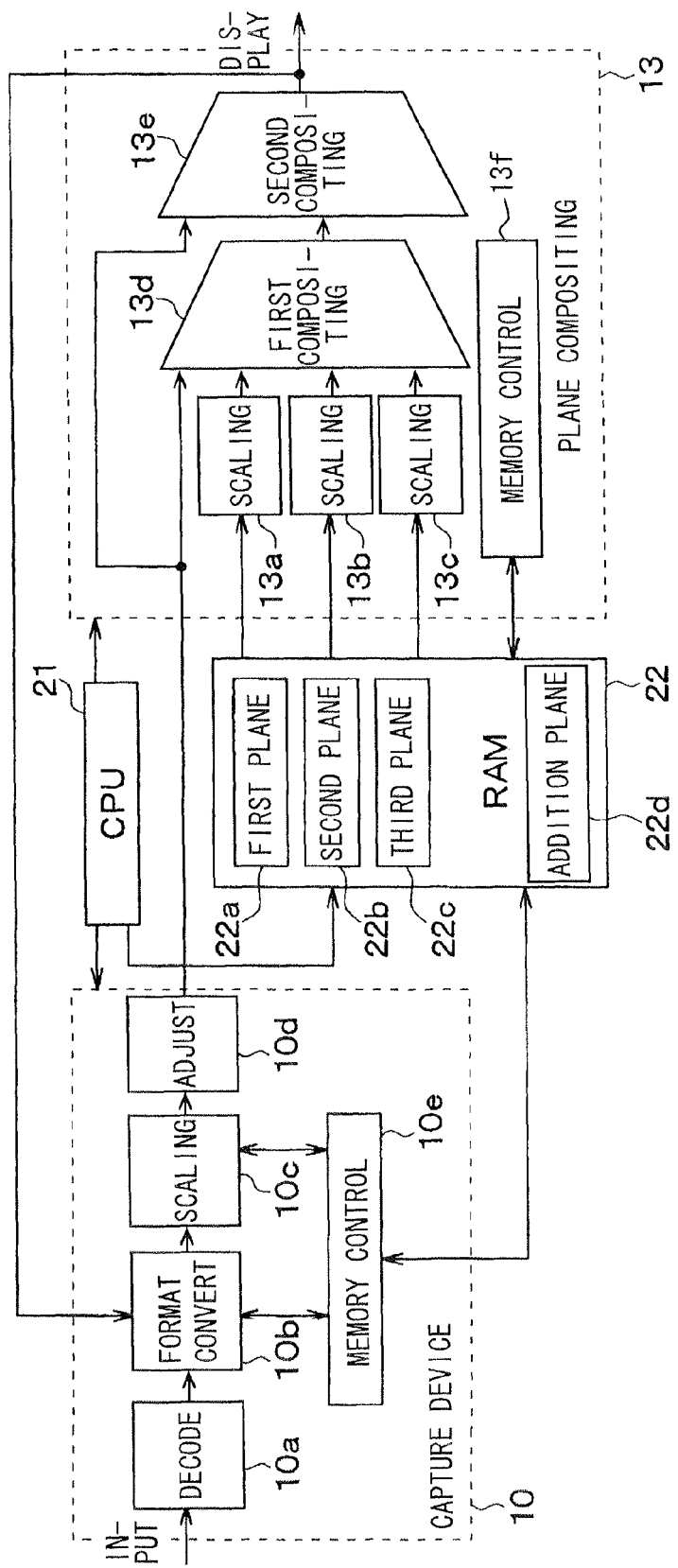
FIG. 2 is a diagram illustrating a video capture device, a plane compositing device, and a RAM.

A first embodiment will be described. FIG. 1 is a diagram illustrating a configuration of a navigation apparatus for a vehicle according to the present embodiment. The navigation apparatus 1 is mounted to a vehicle, and includes a video capture device 10, a locating device 11 (also called herein a position detection device 11), a display device 12 (also called herein an image display device 12), a plane compositing device 13, an operation device 14, a wireless communication device 15, a map data acquisition device 16 and a controller 17 (also called a control device 17).

The video capture device 10 receives an analog video signal from an on-board video output device (not shown) such as an on-board camera, an on-board video output device and the like, and outputs image data to the plane compositing device 13 in accordance with the received video signal. The video capture device 10 can acquire and record image data that is outputted from the plane compositing device 13 to the image display device 12, and can output the recorded image date to the plane compositing device 13. The video capture device 10 may be a circuit for performing the above operations.

The locating device 11 includes sensors (not shown) such as an acceleration sensor, a geomagnetic sensor, a gyro-sensor, a vehicle speed sensor, a GPS receiver and the like. The locating device 11 outputs to the controller 17, information for identification of the present location heading direction and speed of the vehicle based on respective prosperities of these sensors. Known sensors may be used as the sensors of the locating device 11.

The display device 12 displays an image on a display screen in accordance with the image data outputted from the plane compositing device 13.

The plane compositing device 13 combines image data for multiple image sheets, which are generated by the controller 17, into composite image data on an as-needed basis. The plane compositing device 13 outputs the composite image data as display image data (i.e., image data for being displayed) to the image display device 12. The plane compositing device 13 may be a circuit for performing the above operations. Each image data of one image sheet, which is to be combined, is also referred to herein as a layer. The layer is generated by the controller 17 or outputted from the video capture device 10.

The operation device 14 directly receives and accepts user operation thereon, and outputs a signal to the controller 17 in accordance with details of the received operation.

The wireless communication device 15 can have wireless connection to a base station on the outside of the vehicle, and can receive various information from an apparatus (e.g., a Web server) on a wide area network (e.g., Internet) via the base station and output the received information to the controller 17. The base station may be a wireless LAN access point, a base station for data communication network of mobile phone, or the like. A known device can be used as the wireless communication device 15

The map data acquisition device 16 reads data from a non-volatile storage medium such as DVD, CD, HDD and the like. The map data acquisition device 16 may write data to the non-volatile storage medium if possible. The storage medium stores therein a program to be executed by the controller 17, known map data for map display, and the like.

The controller 17 includes a microcomputer (or computer) having a CPU 21, RAM 22, a ROM 23 and the like. From the ROM 23, the CPU 21 (which can act as a computation circuit) reads a program for operation of the navigation apparatus 1 and executes the program. In executing the program, the CPU 21 performs the following. The CPU 21 reads information from the RAM 22, the ROM 23 and the map data acquisition device 16 and writes information to, the RAM 22. The CPU 21 may write information to the storage medium of the map data acquisition device 16 if possible. Further, the CPU 21 receives signals from the locating device 11, the operation device 14 and the wireless communication device 15, and controls the video capture device 10, the plane compositing device 13 and the wireless communication device 15.

The CPU 21 executes programs and thereby performs various processes including a present position detection process (i.e., locating process), a guidance route calculation process, a route guidance process, a display control process and the like.

The locating process includes identifying the present location and heading direction of the vehicle by using a map matching method or the like based on signals form the locating device 11. The guidance route calculation process includes receiving an input of a destination from the user via the operation device 14 and calculating an optimum guidance route from the present location to the destination. The route guidance process includes providing vehicle drive guidance along the guidance route. In the route guidance process, for example, a speaker 14 outputs guidance speech instructing a right turn, a left turn etc. before the vehicle reaches a guidance point on the guidance route such as an intersection and the like.

The display control process includes controlling the video capture device 10, the plane compositing device 13 and the like in order to display various images on the display screen of the image display device 12. The images displayed by the display control process include a map image, a menu image and the like. The CPU 21 determines images to be displayed on the image display device 12, based on the user operation on the operation device 14, the present position of the vehicle, route guidance process conditions, or the like.

For example, during the route guidance process, the image display device 12 displays a map of a specific region such as a region surrounding the present location of the vehicle and the like. Then, when a user operates the operation device 14 for menu display, display (i.e., the displayed image) is switched from the map to the menu image containing user selectable button icons etc. Such icons allow a user to select a process to be performed by the CPU 21, and adjust or set various parameters for operation of the CPU 21.

For illustration of details of the image display control process, the video capture device 10, the plane compositing device 13 and the RAM 22 are described in detail in terms of configuration. The video capture device 10 includes a decoder 10a, a format conversion unit 10b, a scaling unit 10c (also called herein a size-enlargement size-reduction unit 10c), a video adjust unit 10d and a memory controller 10e. These components 10a to 10e of the video capture device 10 can operate under control of the CPU 21.

The decoder 10a converts an analog video signal, which is outputted from the video output device such as the on-board camera, the video playback device and the like, into digital image. The decoder 10a outputs the digital image data to the format conversion unit 10b.

The format conversion unit 10b performs a predetermined format conversion on the image data received from the decoder 10a or the plane compositing device 13. The predetermined format conversion includes, for example, conversion from RGB format to YUV 422 format, conversion from YUV 444 format to ROB format, and the like. The format-converted image data is recorded in the RAM 22 or outputted to the scaling unit 10c by the format conversion unit 10b.

The scaling unit 10c receives the image data from the format conversion unit 10b or reads the image data from the RAM 22. The scaling unit 10c performs scaling processing on the image data. The scaling process is size-enlargement processing, size-reduction processing or the like determined by the CPU 21 on an as-needed basis. The scaling unit 10c outputs the processed image data, which is the image data obtained as a result of the scaling processing, to the video adjust unit 10d.

Figure 3:
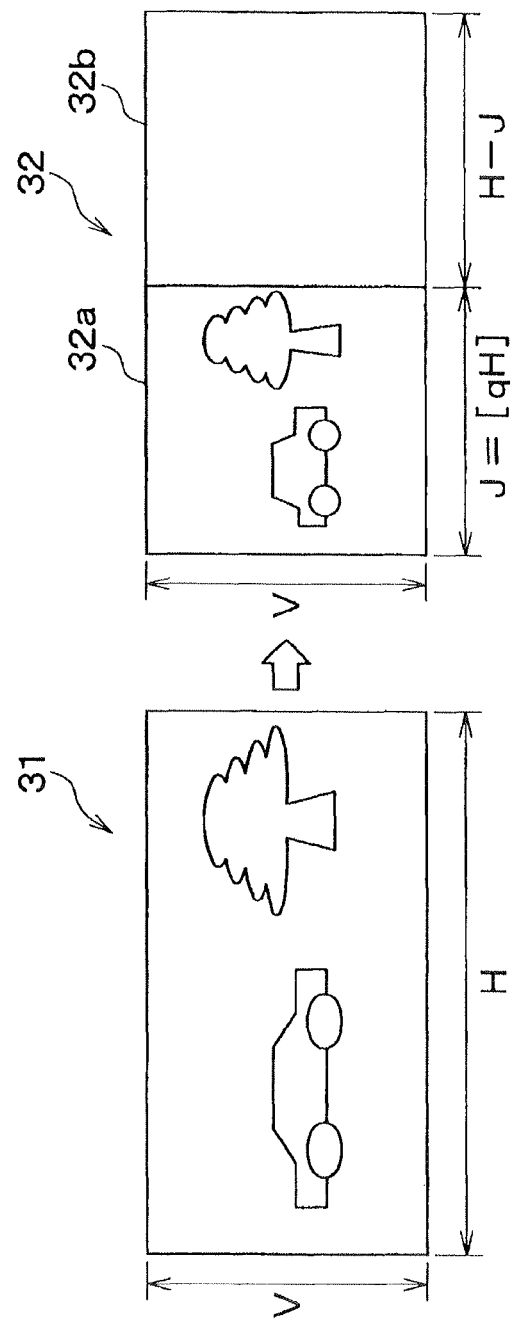
FIG. 3 is a diagram illustrating how a scaling unit performs size-reduction processing on an image.

Now, the scaling processing to be performed by the scaling unit 10c will be described below with reference to FIG. 3. From the CPU 21, the scaling unit 10c receive instructions to perform leftward (or rightward) size reduction with a reduction ratio "q" ($0 < q < 1$). In this case, from original image data 31, the scaling unit 10c generates image data 32 having the same number of pixels in a vertical direction and a horizontal direction as the original image data 31 (i.e., V vertical pixel×H horizontal pixels), as shown in FIG. 3. In the above, the original image data 31 is the image data received from the format conversion unit 10b or retrieved from the RAM 22.

The image data 32 is composed of image data 32a on the left (or the right) and image data 32b on the left (or the right). The image data 32a is one that is obtained by reduction of the number of horizontal pixels of the original image data 31 by a factor of "q". More specifically, the number of horizontal pixels of the image data 32a is reduced to a maximum integer not exceeding "qH". The image data 32a has V vertical pixels and "J" horizontal pixels. The image data 32b has V vertical pixel and "H-J" horizontal pixels. Details of the image data 32b may not matter. For example, the image data 32b may be black or white as a whole.

The video adjust unit 10d receives the image data from the scaling unit 10c performs additional processing on the received image data, and outputs the processed image data (i.e., the image data obtained as a result of the additional processing) to a first compositing circuit 13d and a second compositing circuit 13e of the plane compositing device 13. The additional processing is, for example, offset processing, gain processing, image quality adjust or the like, which is level conversion of image data.

Under control of the CPU 21, the memory controller 10e receives the image data from the format conversion unit 10b and records the received image data in the RAM 22, or outputs the image data stored in the RAM 22 to the scaling unit 10c.

In some cases, in the video capture device 10, the decoder 10a may be different in operation clock frequency from the scaling unit 10c and the video adjust unit 10d. The scaling unit 10c and the video adjust unit 10d can operate at the same operation clock frequency as the plane compositing device 3, so that the video capture device 10 and the plane compositing device 13 are synchronized with each other in terms of operation timing.

Under normal conditions, the format conversion unit 10b acquires image data from the decoder 10a at the same operation clock frequency as the decoder 10a, and the format conversion unit 10b outputs the image data at the same operation clock frequency as the plane compositing device 13. However, as described later, when the format conversion unit 10b acquires image data from the plane compositing device 13, the format conversion unit 10b acquires, under control of the CPU 21, image data from the decoder 10a at the same operation clock frequency as the plane compositing device 13.

The RAM 22 has three planes 22a, 22b, and 22c as a portion of memory area of the RAM 22. The three planes are a first plane 22a, a second plane 22b and a third plane 22c. It should be noted that the number of planes may be greater than or equal to three. For example, the number of planes may be eight. Each plane 22a to 22c can act as a memory area for temporarily retaining one layer. The planes 22a to 22c can be used when the plane compositing device 13 combines images into a composite image.

The RAM 22 further has an addition plane 22d as another portion of the memory area the RAM 22. The addition plane 22d is a memory area for retaining the image data that is outputted from the second compositing circuit 13e and inputted to the video capture device 10.

The plane compositing device 13 includes a first scaling unit 13a, a second scaling unit 13b, a third scaling unit 13c, a first compositing circuit 13d, a second compositing circuit 13e and a memory controller 13f. These components 13a to 13f of the plane compositing device 13 can operate under control of the CPU 21

The first scaling unit 13a, the second scaling unit 13b and the third scaling unit 13c read data from the first plane 22a, the second plane 22b and the third plane 22c, and perform scaling processing on the read data, respectively. The scaling processing is size-enlargement processing, size-reduction processing or the like determined by the CPU 21. To the first compositing circuit 13d, each of the first scaling unit 13a, the second scaling unit 13b and the third scaling unit 13c outputs a layer obtained as a result of the scaling processing.

The scaling units 13a to 13c are provided in the plane compositing device 13 so that the number of scaling units 13a to 13c is equal to the number of planes 22a to 22c. Thus, if four or more planes are provided in the RAM 22, four or more scaling units are provided in the plane compositing device 13 accordingly. Details of the size-reduction processing performed by the scaling units 13a to 13c can be the substantially same as that performed by the scaling unit 10c.

The first compositing circuit 13d receives the image data (layers) outputted from the scaling units 13a to 13c and receives the layer outputted from the video adjust unit 10d of the video capture device 10, and combines these received layers in a manner according to control of the CPU 21. The composite image data, which is image data obtained as a result of the above combining of the layers, is outputted to the second compositing circuit 13e.

Figure 4:
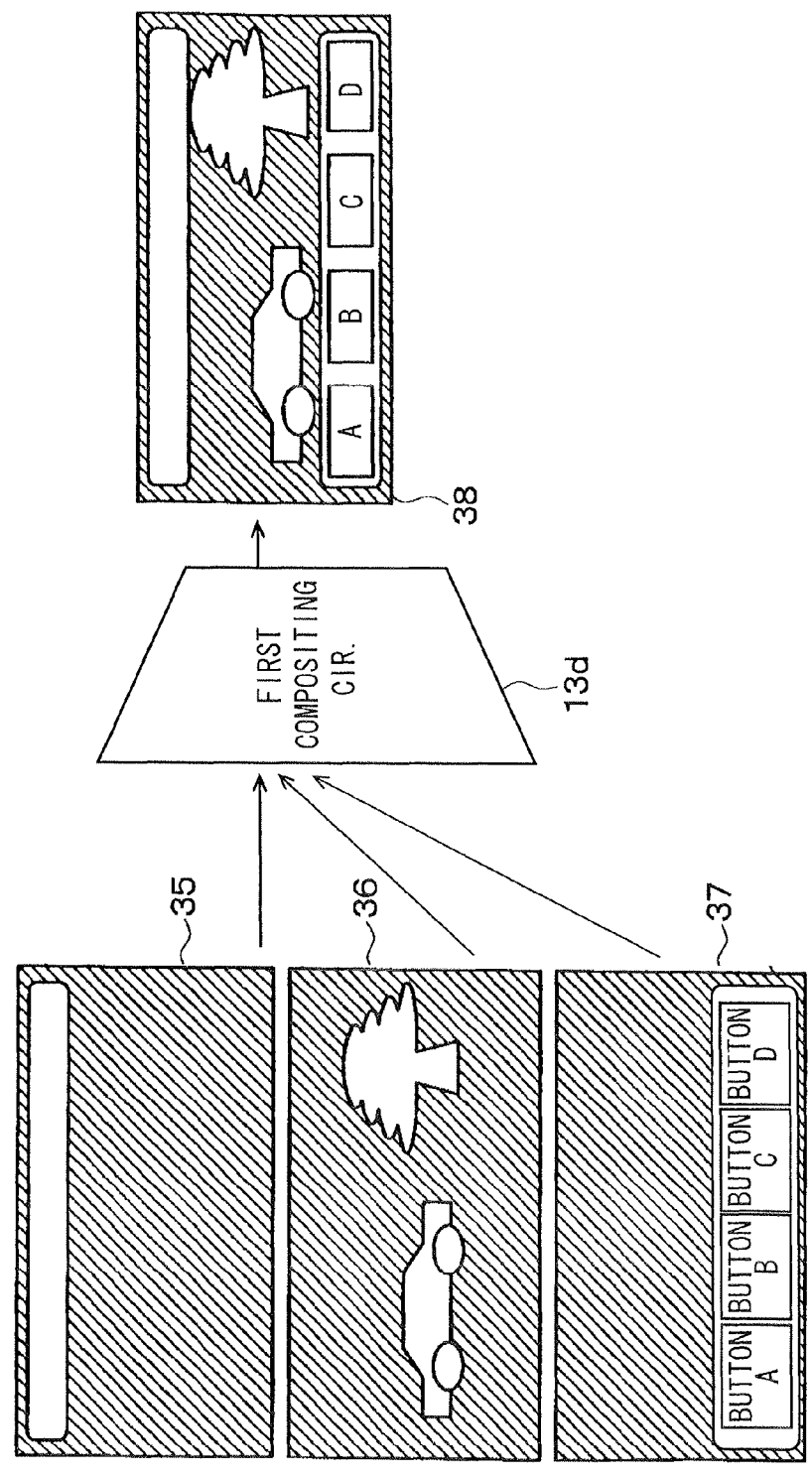
FIG. 4 is a diagram illustrating an example of how a first compositing unit combines images by image composition.

FIG. 4 is a diagram illustrating an example of how the first compositing circuit 13d combines image data. In this example, the scaling units 13a to 13c respectively read image data 35 to 37 from the planes 22a to 22c, and output the image data 35 to 37 to the first compositing circuit 13d without, size enlargement and size reduction. The first compositing circuit 13d combines the image data 35 to 37 into composite image data 38 and outputs the composite image data 38.

The first compositing circuit 13d conducts compositing (i.e., combining) on a one-pixel basis. That is, in certain timing, the first compositing circuit 13d acquires color data (e.g., RGB data) of a pixel of the image data 35 to 37 from each of the scaling units 13a to 13c, wherein the pixel of each of the image data 35 to 37 to be acquired is at the same location between the image data 35 to 37. The acquired color data of the pixels in the same location are combined.

The following manner may be employed as a manner for combining the color data of the pixels at a certain location. Color data values of the pixels may be simply added together. Alternatively, the color data values of the pixels may be respectively multiplied by weighting factors, and may be added together. Alternatively, a color data value of only a certain pixel may be used.

The second compositing circuit 13e includes a hardware switch circuit that is switchable selectively into multiple states under control of the CPU 21. Under normal conditions, the second compositing circuit 13e is in a first state where the image data received from the first compositing circuit 13d is directly outputted to the image display device 12 via the second compositing circuit 13e. This image data outputted from the second compositing circuit 13e to the image display device 12 is also outputted to the format conversion unit 10b of the video capture device 10 at the same time. During the below-described reset of the plane compositing device 13, the second compositing circuit 13e is in a second state where an output line of the video adjust unit 10d is directly connected to an input line of the image display device 12, and thereby, an output signal from the video adjust unit 10d is directly outputted to the image display device 12 even when the plane compositing device 13 is reset.

Figure 5:
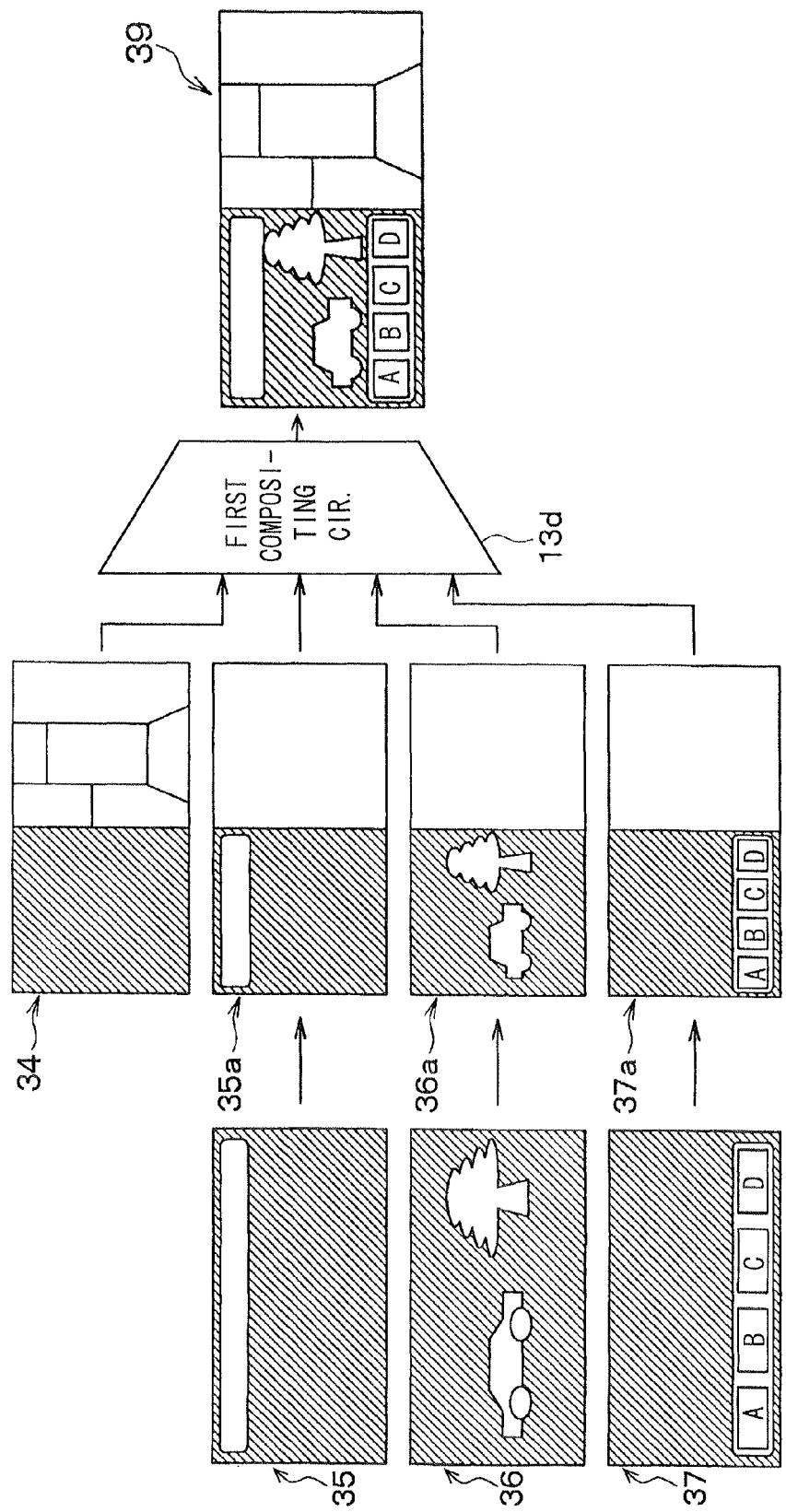
FIG. 5 is a diagram illustrating another example of how a first compositing unit combines images by image composition.

FIG. 5 is a diagram illustrating another example as to how the first compositing circuit 13d combines image data. In this example, the scaling units 13a to 13c respectively read image data 35 to 37 from the planes 22a to 22c, and perform the leftward size reduction on the image data 35 to 37 with a reduction ratio of ½, thereby generating size-reduced image data 35a to 37a. The scaling units 13a to 13c output the generated image data 35a to 37a to the first compositing circuit 13d.

As for the video capture device 10, the decoder 10a receives an analog video signal of a camera image from the on-board camera and converts the analog video signal into digital image data. The format conversion unit 10b performs rightward size-reduction on the converted image data with a reduction ratio of ½, thereby generating image data 34. The video adjust unit 10d performs various adjustments on the image data 34 and outputs the adjusted image data 34 to the first compositing circuit 13d. In the above, the format conversion unit 10b operates at the same operation clock frequency as the decoder 10a.

The first composting circuit 13d combines these image data 34, 35a to 37a into composite image data 39 and outputs the composite image data 39 to the second compositing circuit 13e. In the above compositing, for each pixel leftward then a center of the composite image data 39, the first compositing circuit 13d employs the sum of data of counterpart pixels of the image data 35a to 37a as the data of the pixel of the composite image 39. For each pixel rightward than the center of the combined image data 39, the first compositing circuit 13d employs data of the pixel of the image data 34 as the data of the pixel of the composite image data 39.

Under control of the CPU 21, the memory controller 13f controls, for example, the flow of data from the planes 22a to 22c of the RAM 22 to the scaling units 13a to 13c in terms of data read timing and data read address.

Figure 6:
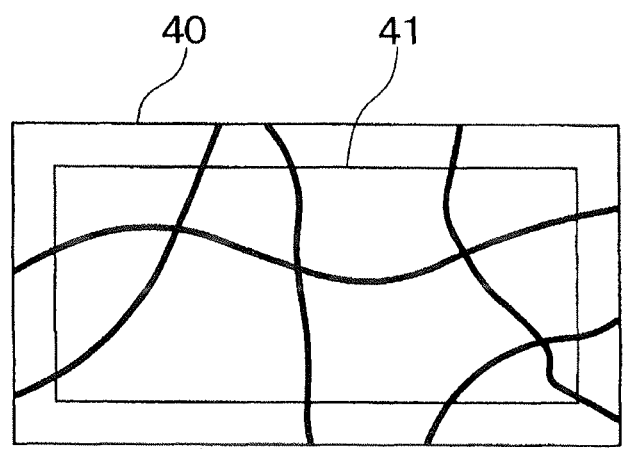
FIG. 6 is a diagram illustrating an overscan mode.

The display device 12 displays the image data outputted from the second compositing circuit 13e in an overscan mode. As shown in FIG. 6, in the overscan mode (also called overscan state), the display device 12 does not display pixels of an edge portion of the image data 40 but displays pixels of only a center portion 41 of the image data 40 outputted from the plane compositing device 13.

The CPU 21 can implement the image display control process by controlling the above-described video capture device 10, the plane compositing device 13 and the RAM 22. For example, in order to display a composite image containing a map and a button, the CPU 21 may perform the following. In an area of the RAM 22 other than the planes, the CPU 21 may generate map image data to be displayed and button image data to be displayed, and the CPU 21 may change the map image and the button image if needed. Then, for each frame of consecutive frames, the CPU 21 may control the video capture device 10, the plane compositing device 13 and the RAM 22 so that: the map image data is stored in the first plane 22a and the button image data is stored in the second plane 22b; the first scaling unit 13a and the second scaling unit 13b are instructed not to enlarge or downsize the image data; and the first compositing circuit 13d is instructed to generate composite image data by adding only outputs from the first scaling unit 13a and the second scaling unit 13b.

In some cases, in the image display control process, the display of the display device 12 is switched from one scene to another scene. An example case of the switching of the display of the display device 12 is that, in response to user operation on the operation device 14, the display is changed from menu image display to map image display or from the map image display to the menu image display.

Figure 7:
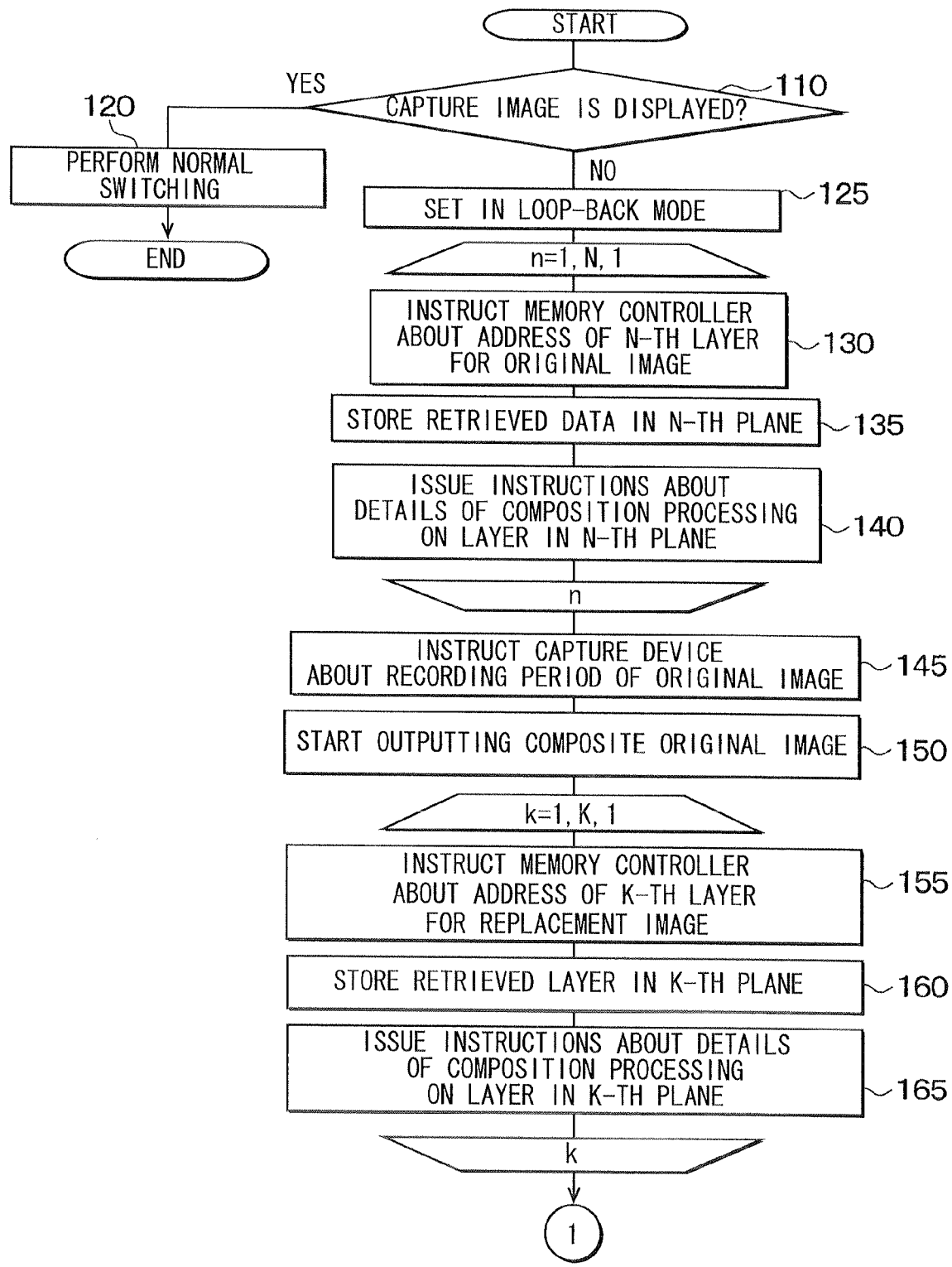
FIGS. 7 and 8 are flowcharts illustrating a switch process, which a CPU performs for display switching.
Figure 8:
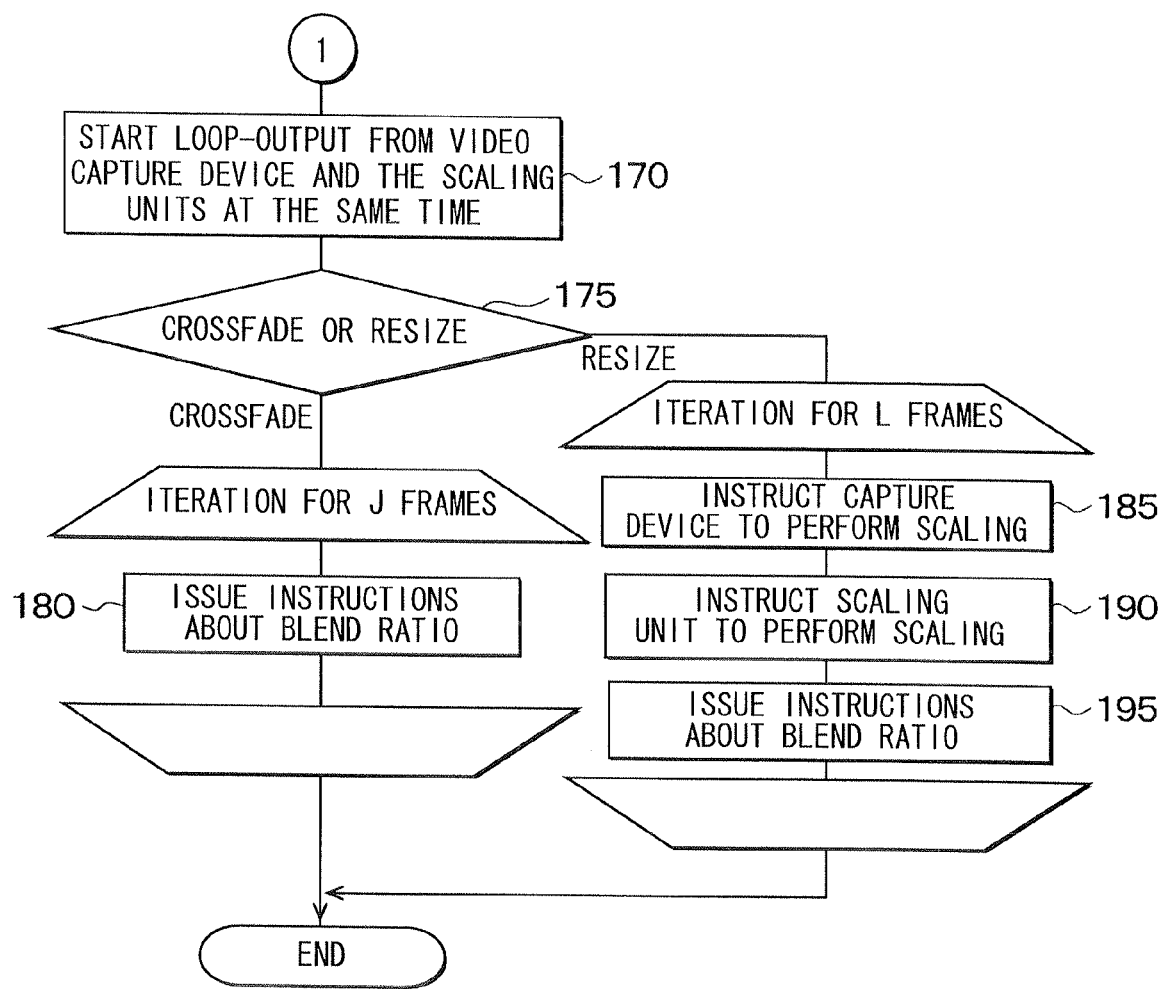

To conduct this kind of display switching, the CPU 21 executes a predetermined program and perform a switching process illustrated in FIGS. 7 and 8. This switching process allows the display of the display device 12 to continuously and smoothly change from an original image to a replacement image and makes the display more interesting. In the present disclosure, this kind of continuous switching of the display is referred to also as smooth switching.

Figure 9:
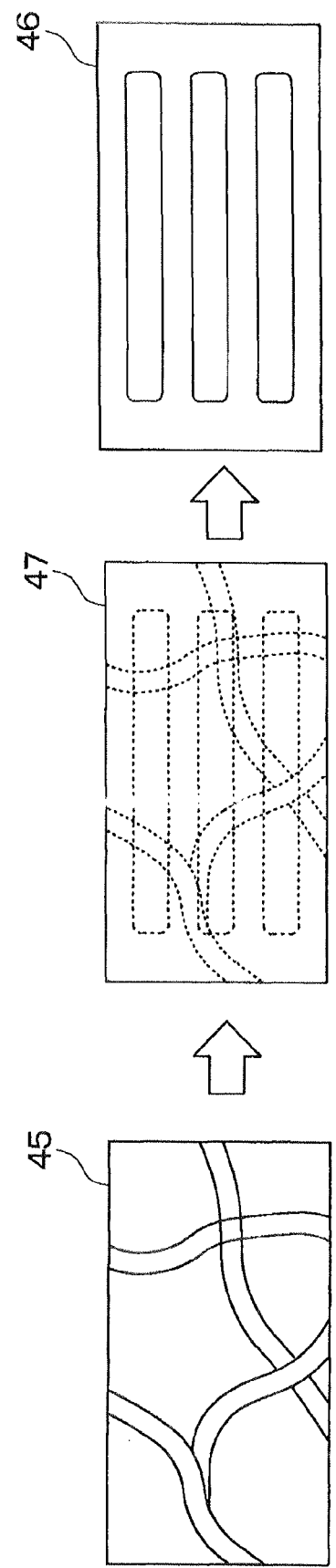
FIG. 9 is a diagram illustrating crossfade.

A concrete smooth switching manner includes crossfade (called also overlap) and resize. In the crossfade, as shown in FIG. 9, blend ratio (e.g., display opacity) of the original image 45 is gradually decreased and blend ratio of the replacement image is gradually, increased, so that the display is continuously changed from the original image 45 to the replacement image 46 via a blend image 47.

Figure 10:
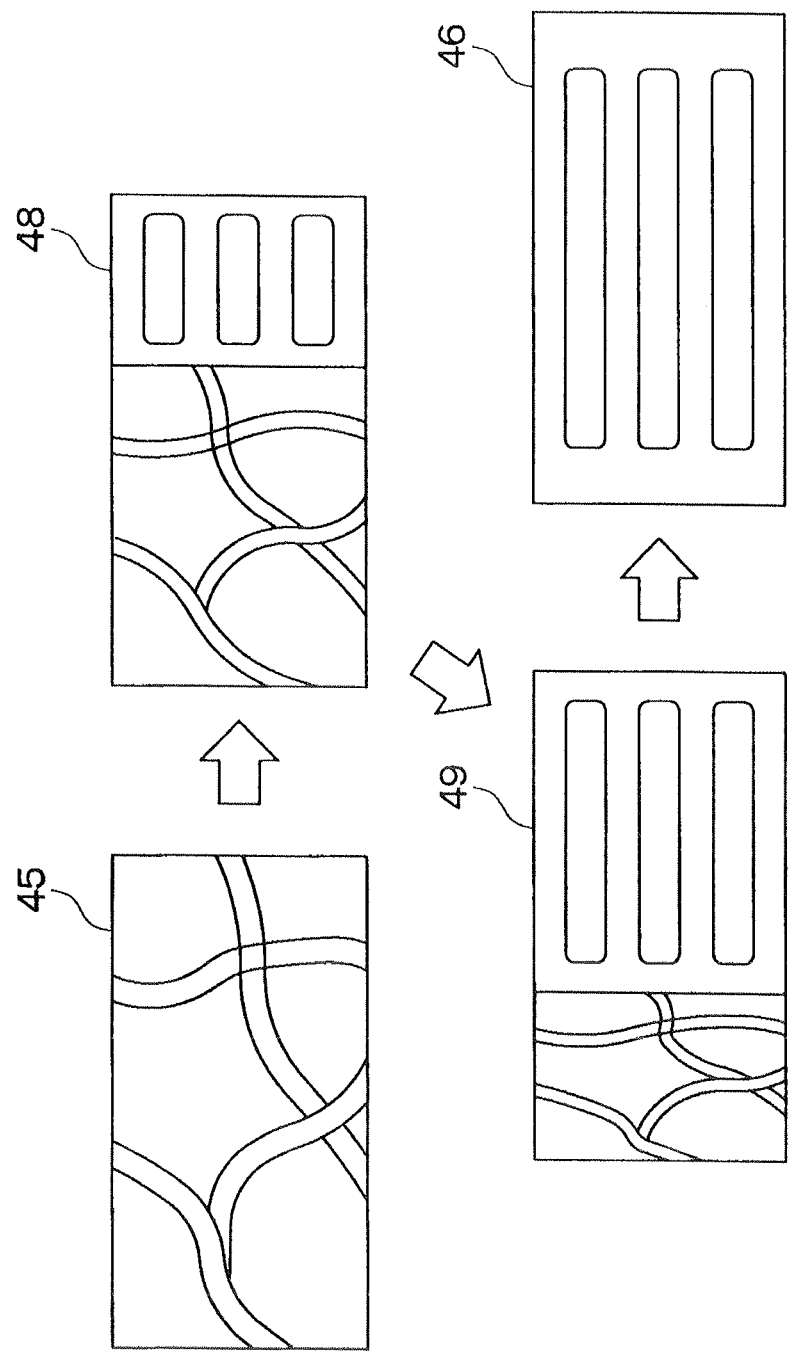
FIG. 10 is a diagram illustrating resize.

In the resize, as shown in FIG. 10, the original image 45 is gradually downsized to a smaller area on the display screen and the replacement image 46 is gradually enlarged to a larger area on the display screen, so that the display is changed from the original image 45 to the replacement image 46 via horizontally-partitioned images 48, 49.

Now, the switching process will be described in detail with reference to FIGS. 7 and 8. At S110, the CPU 21 determines whether a capture image is displayed. Specially, the CPU 21 makes a determination as to whether, at the present time, the video capture device 10 receives the analog image signal from the on-board video output device, and the image data of an image generated from the received analog image signal (i.e., capture image) is outputted to the display device 12 as being a single agent or as being combined with another image.

The above determination is made in order to check whether it is possible to perform the smooth switching. In the present embodiment, when the video capture device 10 is not being used for display of the capture image, the smooth switching is performed by using a function of the video capture device 10. For this reason, when the video capture device 10 is being used for display of the capture image, the smooth switching cannot be performed.

When the CPU 21 determines that the capture image is displayed, the process proceeds to S120 where the CPU 21 does not perform the smooth switching but performs normal display switching. Specifically, the original image data, which is image data displayed before the display switching, is used as the image data for a certain frame. As the image data for a frame subsequent to the certain frame, the replacement image data is used. In this way, the display is switched instantaneously and discontinuously. After S120, the switching process is ended.

When the CPU 21 determines that the capture image is not displayed, the process proceeds to S125. At S125, the CPU 21 changes setting into a loop-back mode. Specifically, the CPU 21 switches operation clock of the format conversion unit 10b of the video capture device 10 into the same operation clock of the plane compositing device 13. Thereby, the format conversion unit 10b can acquire the image data outputted from the second compositing circuit 13e, in synchronization with timing of outputting the image data from the second compositing circuit 13e.

Then, a loop S130 to S140 is cyclically performed N times while "n" is increased from 1 to N in increments of 1, where N is equal to the number of layers used to generate the original image data and is thus natural number less than or equal to the number of scaling units 13a to 13c.

In each cycle of the loop, the CPU 21 performs the following. At S130, the CPU 21 issues instructions to the memory controller 13f, the instructions including information on an address (memory address) of a n-th layer for use in making the original image data by image composition. For example, when the original image data is assumed to be the image data 38 illustrated in FIG. 4, the image data 35, 36 and 37 respectively correspond to a first layer, a second layer and a third layer. When the memory controller 13f receives the instruction, the memory controller 13f reads the image data for one layer from the RAM 22 in accordance with the address in the instructions. At S135, the CPU 21 controls the memory controller 13f so that the read layer is stored in the n-th plane in the RAM 22.

At S140, the CPU 21 issues instructions to an n-th scaling unit and the first compositing circuit 13d, the instructions including information on details of processing on the layer stored in the n-th plane for image, composition. The n-th scaling unit is one of the scaling units 13a to 13c. For example, when the original image data is assumed to be the image data 38 illustrated in FIG. 4, the CPU 21 instructs the n-th scaling unit to output the layer in the n-th plane to the first compositing circuit 13*d* without changing the layer (without enlargement and size-reduction), and the CPU 21 instructs the first compositing circuit 13*d* to add this layer to other layers.

When the loop S130 to 140 has been cyclically performed N times, the layers for use in making the original image by image composition are respectively stored in the planes 22*a* to 22*c*, and the scaling units 13*a* to 13*c* and the first compositing circuit 13*d* are ready to make the original image data from the layers by image composition.

At S145, the CPU 21 causes the video capture device 10 to prepare for record of the original image data. Specifically, the CPU 21 instructs the memory controller 10*e* to record certain image data in the addition plane 22*d* of the RAM 22 as the original image data, wherein the certain image data is the image data that the format conversion unit 10*b* receives from the second compositing circuit 13*e* during a period from a predetermined start time to a predetermined end time.

In the above, the predetermined start time is a time when the second compositing circuit 13*e* starts outputting the original image data. The predetermined end time is a time when the second compositing circuit 13*e* ends outputting the original image data.

At S150, the CPU 21 controls the scaling units 13*a* to 13*c* and the first compositing circuit 13*d*, so that the scaling units 13*a* to 13*c* start reading and outputting the layers, and the first compositing circuit 13*d* starts combining the layers into the original image data and outputting the original image data. In this way, operations of the scaling units 13*a* to 13*c* and the first compositing circuit 13*d* are in accordance with the instructions issued at S140, the instructions including the details of the processing. As a result, the original image data is outputted to the second compositing circuit 13*e*. The second compositing circuit 13*e* outputs the received original image data to the image display device 12 and the format conversion unit 10*b* at the same time. At this time, the original image data acquired by the format conversion unit 10*b* is recorded in the addition plane 22*d* by the memory controller 10*e* in accordance with the instructions issued at S145.

When the outputting and recording of the original image data is ended, the CPU 21 cyclically performs a loop S155 to S165 K times while "k" is increased from 1 to K in increments of 1, wherein K is equal to the number of layer used to generate the replacement image data and is thus natural number less than or equal to the number of scaling units 13*a* to 13*c*.

It is possible to describe processing details of S155, S160 and S165 by replacing "original image" in S130, 135 and S140 with "replacement image". That is, the processing details of S155, S160 and S165 can be the substantially same as those of S130, 135 and S140 except "original image" and "replacement image".

When the loop S155 to 165 has been cyclically performed K times, the layers for use in making the replacement image by image composition are respectively stored in the planes 22*a* to 22*c*, and the scaling units 13*a* to 13*c* and the first composting circuit 13*d* are ready to make the replacement data by image composition.

At S170 (see FIG. 8), the CPU 21 controls the video capture device 10 and the scaling units 13*a* to 13*c* so that the video capture device 10 and the scaling unit 13*a* to 13*c* simultaneously start loop-outputting the images (the original image and the replacement image).

As for the loop-outputting by the video capture device 10, the loop-outputting is to cyclically output, from the video adjust unit 10*d* to the first compositing circuit 13*d*, the original image data acquired from the plane compositing device 13 and stored in the addition plane 22*d*. That is, the loop-outputting by the video capture device 10 is a successive output of the original image data for multiple frames. As for the loop-outputting by the scaling units 13*a* to 13*c*, the loop-outputting is to cyclically output, to the video adjust unit 10*d* the replacement image data stored in the planes 22*a* to 22*c* corresponding to respective scaling units 13*a* to 13*c*. That is, the loop-outputting by the scaling units 13*a* to 13*c* is a successive output of the replacement image data for multiple frames.

A way for controlling the video capture device 10 to cause the video capture device 10 to loop-output the original image data may be the following. The memory controller 10*e* of the video capture device 10 is commanded to cyclically read and output, the original image in the addition plane 22*d*. In this way, the scaling unit 10*c* downsizes or does not downsize the read original image data in accordance with instructions from the CPU 21, and outputs the original image data to the video adjust unit 10*d*, and the video adjust unit 10*d* outputs the original image data to the first compositing circuit 13*d*.

Because of the control at S170, (i) the original image data and (ii) the layers for use in making the replacement image data start being synchronously inputted to the first compositing circuit 13*d* from the video adjust unit 10*d* and the scaling units 13*a* to 13*c*, so that pixels in the same location are simultaneously outputted to the first compositing circuit 13*d*.

At the same time of the start of the loop-output, the CPU 21 determines which one of the crossfade and the resize is adopted for the smooth switching. When the crossfade is adopted, a coop S180 is performed for every frame. When the resize is adopted, a loop S185 to S195 is performed for every frame.

The CPU 21 may determine which one of the crossfade and the resize is adopted for the smooth switching, in accordance with a predetermined setting prearranged by user operation on the operation unit 14. Alternatively, the CPU 21 may randomly determine which one of the crossfade and the resize is adopted for the smooth switching, by using pseudorandom numbers.

When it is determined that the crossfade is adopted, the process proceeds to S180. At S180, the CPU 21 issues instructions to the first compositing circuit 13*d*, the instructions including information on a blend ratio "$\alpha$" between (i) the replacement image data to be combined by the first compositing circuit 13*d* based on the data outputted from the scaling unit 13*a* to 13*c*, and (ii) the original image data inputted from the video capture device 10 to the first compositing circuit 13*d*.

The blend ratio "$\alpha$" is determined based on how many times S180 has been performed since the S170 was performed. Note that S180 is performed for each frame. Thus, the number of times S180 has been performed corresponds to the number of frames since S170. Specifically, when color data value of a certain pixel of the original image data is denoted by X, and when color data value of the certain pixel of the replacement image data is denoted by Y, color data value of the certain pixel of the composite (combined) image data is given as $Z=\alpha X+(1-\alpha)Y$. This blend ratio "$\alpha$" has the same value in any pixel throughout the same frame although the blend ratio "$\alpha$" is different in value between frames. More specifically, the blend ratio "$\alpha$" is set to "$\alpha=1-t/J$" where "t" is the number of times S180 has been performed including this S180 since the S170 was performed. Note that "t" describes timing of outputting the image data for a t-th frame, which corresponds to the number of times S180 has been performed. Thus, the blend ratio "$\alpha$" is gradually deceased with time between consecutive frames. Since "J" is the number of iterations of the S180 loop and is a predetermined value, the switching of display is smoother as "J" is larger.

Through the above-described control, it is possible to implement the crossfade as the smooth switching from the original image data to the replacement image data, as illustrated in FIG. 9. After the CPU 21 has preformed the loop S180 J times, the switching process is ended. Thereafter, the CPU 21 performs normal display control.

When it is determined at S175 that the resize is adopted, the process proceeds to S185. At S185, the CPU 21 instructs the scaling unit 10c of the video capture device 10 to perform leftward size-reduction on the original image data, which is received from the format conversion unit 10b, with a reduction ratio of "β".

At S190, the CPU 21 instructs some of the scaling units 13a to 13c to perform rightward size-reduction on layers, which are read from some of planes 22a to 22c corresponding to the some of the scaling units 13a to 13c, with a reduction ratio "1−β". In the above, the some of the scaling units 13a to 13c is one or ones for performing the scaling processing on layers to make replacement image data.

The reduction ratio "β" is determined based on how many times S190 has been performed since the S170 was performed. Note that S190 is performed for each frame. Thus, the number of times S190 has been performed corresponds to the number of frames since S170. More specifically, the reduction ratio "β" is set to "β=1−t/L" where "t" is the number of time S190 has been performed, including this S190, since the S170 was performed. Note that "t" describes timing of outputting the image data for a t-th frame, which corresponds to the number of times S190 has been performed. Thus, the reduction ratio "β" is gradually deceased with time between consecutive frames. Since "L" is the number of iterations of a loop S185 to S195 and is a predetermined value, the switching of display is smoother as "L" is larger.

Figure 11:
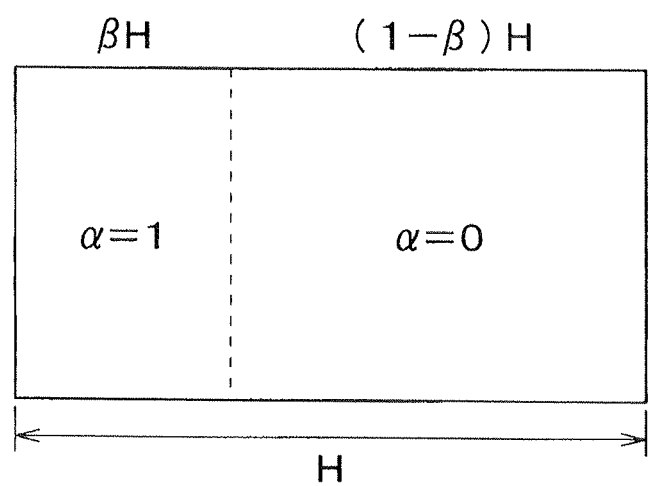
FIG. 11 is a diagram illustrating a relationship between a distribution of blend ratio wand reduction ratio 13 in resizing.

At S195, the CPU 21 issues instructions to the first compositing circuit 13d, the instructions including a ratio "α" of blend (i.e., blend ratio) between (i) the replacement image data to be combined by the first compositing circuit 13d based on the data outputted from the scaling unit 13a to 13c, and (ii) the original image data inputted from the video capture device 10 to the first compositing circuit 13d. The blend ratio "α" in this case is not the same between pixels throughout the same frame. More specifically, distribution of the blend ratio "α" in each frame may be determined in accordance with the reduction ratio "β". For example, let us consider a case of FIG. 11 where the composite image data for each frame has a horizontal width of H pixels. In this case, for a portion of the frame between a left edge of the frame and the βH-th pixel from the left edge, the blend ratio "α" is 1 and only the original image data is used. For the other portion of the frame, the blend ratio "α" is 0, and only the replacement image data is used.

Through the above control, it is possible to implement the resize as the smooth switching from the original image data and the replacement image data. After the loop S185 to S195 has been performed L times, the switch process is ended. Thereafter, the CPU 21 performs the normal display control.

Now, advantages associated with the above smooth switching will be described.

In the smooth switching, the CPU 21 of the present embodiment controls the RAM 22, the plane compositing device 13 and the video capture device 10 in the following manner. First, as shown in FIG. 4, a first set of layers for original image data is stored in a first set of planes (see S130, S135), where the first set of planes is one or more of the planes 22a to 22c, and the number of planes in the first set of planes is N. The first compositing circuit 13d combines the first set of layers together, thereby generating the original image data (see S140). The original image data made in the first compositing circuit 13d is outputted to the video capture device 10, and the video capture device 10 records the original image data in the addition plane 22d of the RAM 22 (see S145, S150).

Figure 12:
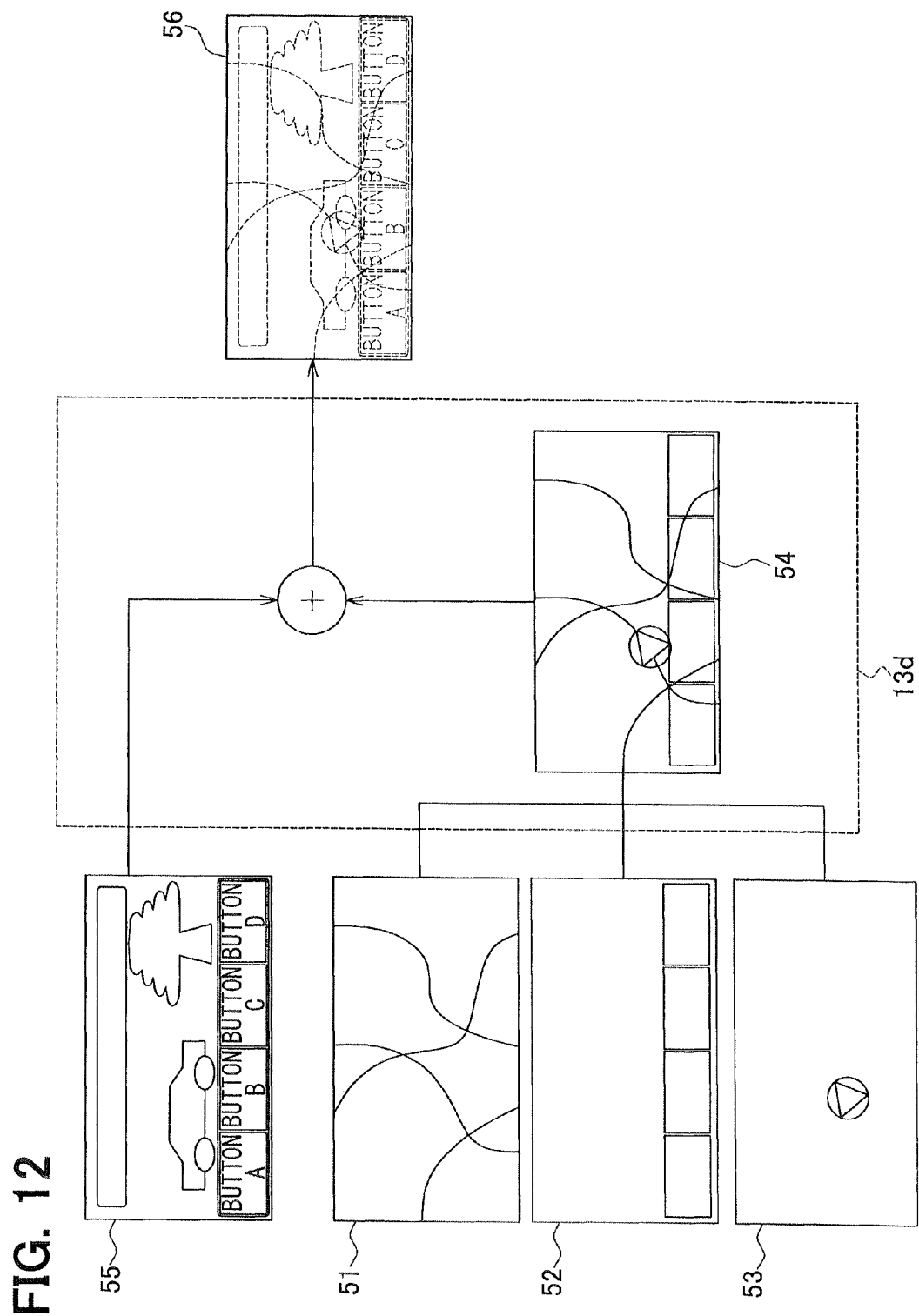
FIG. 12 is a diagram illustrating how image composition is performed in smooth switching.

Then, as shown in FIG. 12, a second set of layers 51 to 53 for replacement image data is stored in a second set of planes (see S155, S160), where the second set of planes is one or more of the planes 22a to 22c, and the number of planes in the second set is K. The first compositing circuit 13d combines the second set of layers together into the replacement image data 54 (see S165).

The second set of layers 51 to 53 and the original image data 55 are synchronously and cyclically inputted to the first compositing circuit 13d (see S170). In this synchronous and cyclical input, one of or both of the blend ratio "α" and the reduction ratio "β" is changed from frame to frame; thereby display content 56 on the display device 12 is switched from the original image data 55 and the replacement image data 54 while a manner of combining the original image data 55 and the replacement image data 54 is being gradually changed between consecutive frames (see S180 to S195).

As can be seen from the above, in the smooth switching, the video capture device 10 records the composite original image data and inputs the composite original image data to again the first compositing circuit 13d; in other words, the original image data is loop-backed by utilizing the available video capture device 10. This eliminates the need for recombining the layers into the original image data. As a result, the planes 22a to 22c become available, and it becomes possible to make a complicated composite replacement image by using the available planes 22a to 22c.

Although the smooth switching requires multiple frames (e.g., 120 frames when it takes two seconds to complete the smooth switching), the number of times a layer is read into each plane during the smooth switching is up to two times. One time is when the layer for the original image is read into. The other time is when the layer for the replacement image is read into.

Therefore, during the loop-outputting of the original image data 55 and the layers 51 to 53 for the replacement image data, contents of the planes 22a to 22c are unchanged and are layers 51 to 53 for the replacement image data. That is, since data in the RAM needs not to be stored in the planes 22a to 22b, an amount of data to be read from the RAM 22 is reduced. In addition, since the CPU 21 needs not generate a further image to perform the smooth switching, processing load of the CPU 21 is reduced.

In a conventional case, since a composite original image made in a first compositing circuit 13d is not returned to a video capture device 10 and is not stored, the smooth switching similar to that of the present embodiment requires that N layers for original image data should be generated and stored in planes, and K layers for replacement image data should be generated and stored in planes. Therefore, in the conventional case, a CPU 21 is involved in huge processing load. Furthermore, if the number of layers N+K exceeds the number of planes 22a to 22c, it becomes impossible to combine all of the N+K layers by using the first compositing circuit 13d, and thus, the CPU 21 should generate in advance a composite layer without using the first compositing circuit 13d. Therefore, in the conventional case, the processing load of the CPU 21 is further increased. The present embodiment can solve this kind of problem by utilizing available resources of the video capture device 10.

That is, once image data for display is created by image composition, the image data for display with no change is returned to the video capture device 10 and is treated like image data acquired from the planes 22a to 22c. Thereby, it is possible to save processing load of the CPU 21 and memory band of the RAM 22.

Second Embodiment

A second embodiment will be described below.

In addition to the operations described in the first embodiment, the navigation apparatus 1 for a vehicle of the present embodiment is configured to perform a screen scrolling operation by utilizing the video capture device 10.

Specifically, in the display control process, the CPU 21 of the navigation apparatus 1 allows screen scrolling while utilizing the video capture device 10, when display content (i.e., content displayable to a user) is lager than the display screen (corresponding to the portion 41 in FIG. 6) of the display device 12. The display content lager than the display screen of the display device 12 is for example a map, display content (information) received from a Web server via the wireless communication device 15, the capture image from the video capture device 10, or the like.

Figure 13:
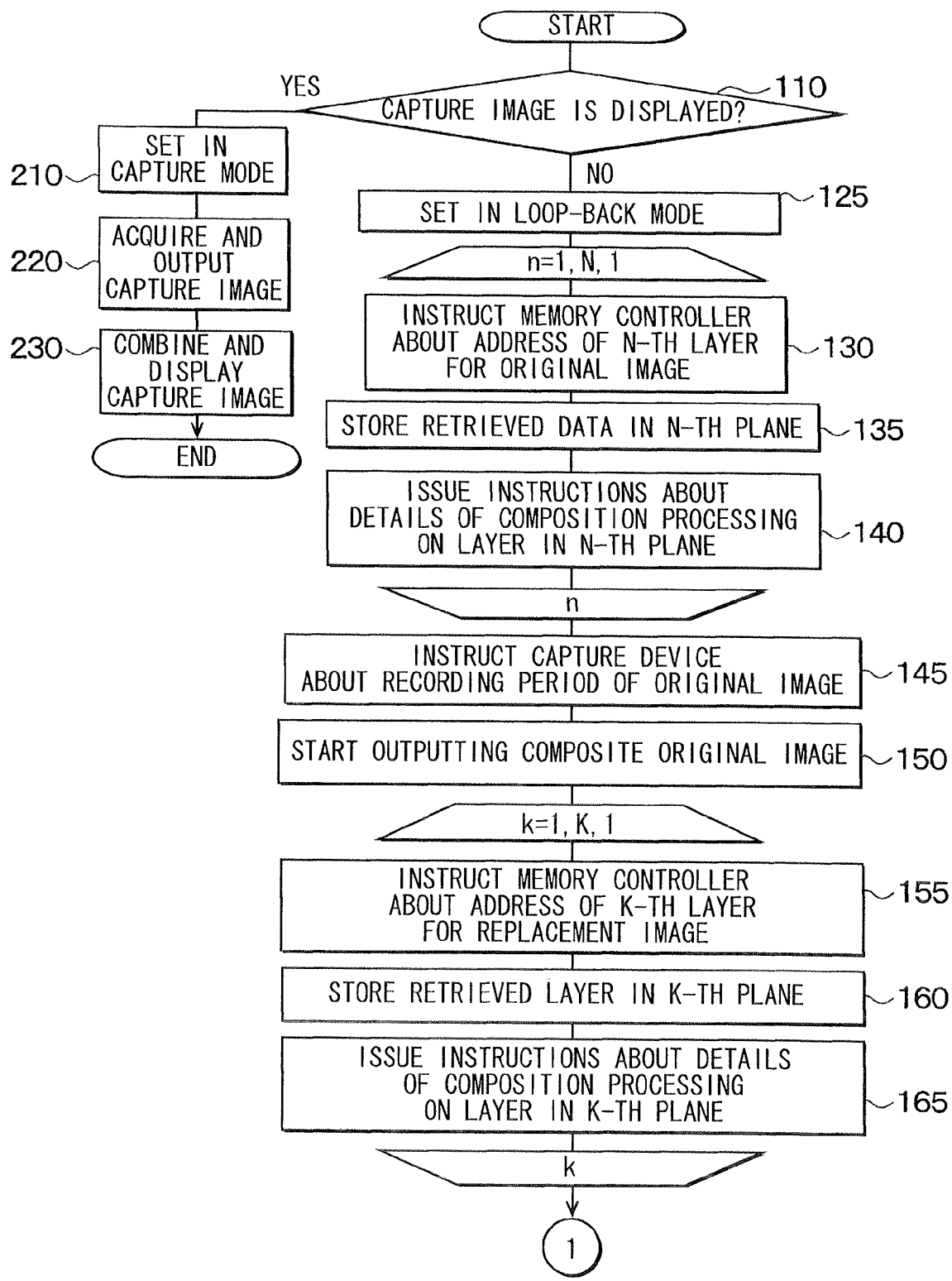
FIGS. 13 and 14 are flowchart illustrating a scroll process.
Figure 14:
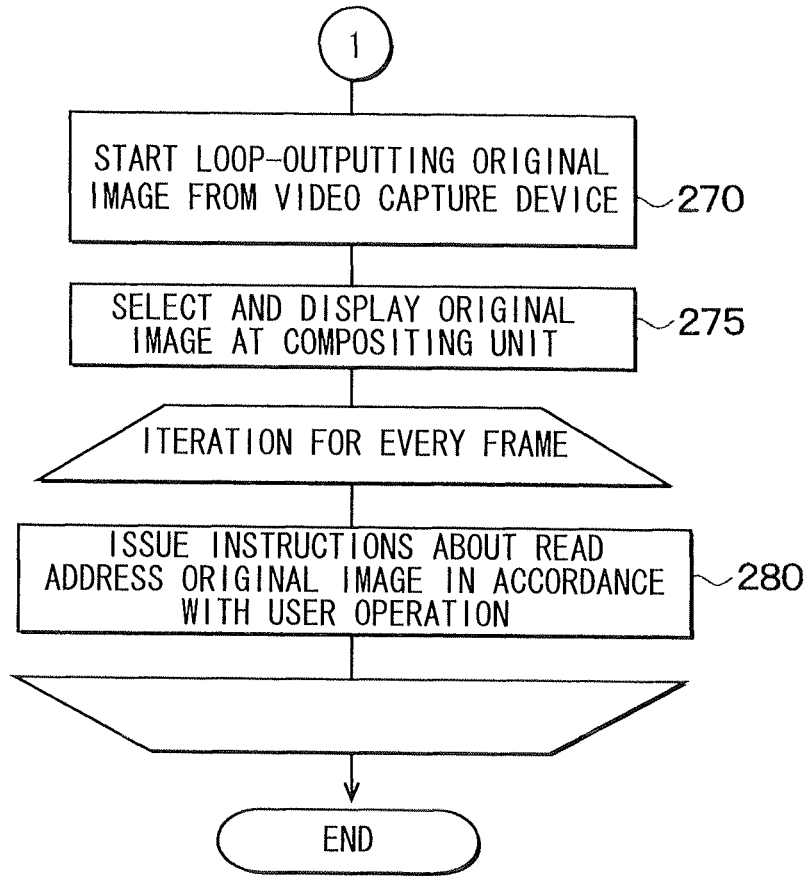

In such a case, the CPU 21 executes a predetermined program and thereby performs a scroll process illustrated in FIGS. 13 and 14. Between FIG. 7 and FIG. 13, like reference numerals are used to refer to like steps. Detailed explanation on steps assigned to the like reference numerals is omitted here. It should be noted that the original image data of the present embodiment is the image data that is scrollable when being displayed to a user. In the present embodiment, any image data can be used as the replacement image data.

When the capture image is displayed, the use of the video capture device 10 to loop-back the original image is not possible. Thus, when the CPU 21 determines at S110 that the capture image is displayed, the process proceeds to S210. At S210, the CPU 21 switches setting into a capture mode. More specifically, the operation clock of the format conversion, unit 10b of the video capture device 10 is switched into the same operation clock of the decoder 10a. Accordingly, the format conversion unit 10b can acquire the image data outputted from the decoder 10a.

At S220, the CPU 21 controls the video capture device 10, so that the video capture device 10 outputs a capture image to the first compositing circuit 13d. In the above, the capture image is based on a signal from the on-board video output device. At S230, the CPU 21 controls the first compositing circuit 13d, so that the first compositing circuit 13d may perform compositing processing on the capture image received from the video capture device 10, and the first compositing circuit 13d outputs the capture image to the second compositing circuit 13e. Then the capture image is displayed and the scroll process is ended.

When the CPU 21 determines at S110 that the capture image is not displayed, the process proceeds to S125 and its subsequent steps so that the CPU 21 performs smooth scrolling while utilizing the available video capture device 10. At S125, the CPU 21 switches setting into a loop-back mode. During the loop S130 to S140, a first set of layers for the original image data, which is image data for scroll, is stored in a first set of planes. The first set of layers is combined into the original image data by the first compositing circuit 13d. In the above, the first set of planes is one or more of the planes 22a to 22c, and the number of planes in the first set is N. At S145 and S150, the CPU 21 controls the video capture device 10 so that the video capture device 10 records the original image data in the addition plane 22d of the RAM 22.

During a loop S155 to S165, a second set of layer for the replacement image data is stored in a second set of planes. The second set of layers is combined into the replacement image data by the first compositing circuit 13d. In the above, the second set of planes is one or more of planes 22a to 22c, and the number of planes in the second set is N. In the present embodiment any image can be used as the replacement image.

At S270 (see FIG. 14), the CPU 21 controls the video capture device 10 so that the video capture device 10 starts loop-outputting the original image data. A specific manner of the above control at S270 is the same as that in the first embodiment.

At S275, the CPU 21 controls the first compositing circuit 13d, so that the first compositing circuit 13d outputs, to the second compositing circuit 13e, only the image data from the video capture device 10. Accordingly, the original image data outputted from the video capture device 10 is outputted to the display device 12 via the first compositing circuit 13d and the second compositing circuit 13e.

In this case, the display device 12 displays the original image in the overscan mode, as described in the first embodiment. That is, as shown in FIG. 6, the pixels of only the center portion 41 of the original image data 40 is actually displayed on the display screen of the image display device 12, and the edge portion of the original image data 40 is not displayed.

Then, the CPU 21 performs a loop S280 on a one-frame basis. At S280, in accordance with user scroll operation on the operation device 14, the CPU 21 controls the memory controller 10e of the video capture device 10 and changes read start address of the original image data in the addition plane 22d.

Figure 15:
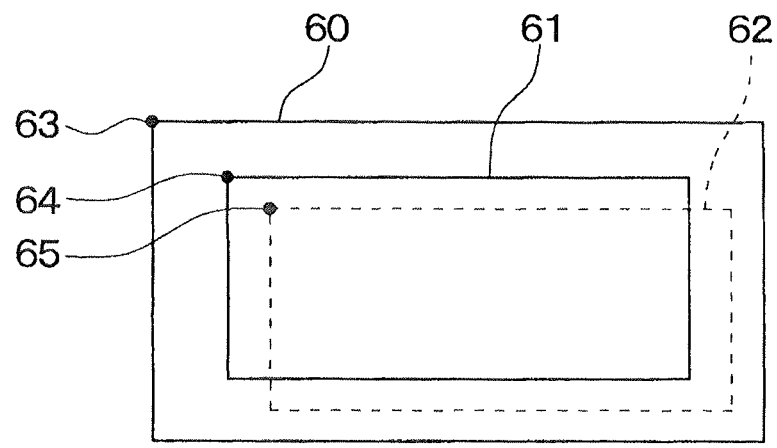
FIG. 15 is a diagram illustrating displayed portions of image data.

For illustrative purposes, it is now assumed that a user operates the operation device 14 to scroll original image data 60 so that an un-displayed portion of the original image data 60 on the lower right of the presently-displayed portion 61 is viewable, as shown in FIG. 15.

A recording method of Raster scan type may be employed as a method of recording color data of pixels, which are arranged in a matrix, of the original image data. More specifically, the color data of pixels of each row are recorded in order of columns. After the color data of the pixel at the last column in a certain row, the color data of the pixel at the first column in a row next to the certain row is recorded, except that the certain row is not the last row. In the present embodiment, when the original image data is read from a beginning address of the original image data, the center portion 61 of the original image data 60 may be displayed.

Therefore if the address of the pixel 63 at the upper left end of the original image data 60 is apart "S" from the address of the pixel 64 at the upper left of the center portion 61, and if a portion 62 having the pixel 65 at its upper left end is desired to be displayed on the displayed device 12, the read start address of the original image data is set to an address located frontward than the address of the pixel 65 by "S" on the RAM 22 in order to display the portion 62.

After the loop S280 is ended, the scroll process is ended. A condition for ending the loop S280 may be the following. A first condition is that a user operation on the operation device 10 for finishing the scroll is inputted. A second condition is that the display of the original image data on the display device 12 has been scrolled beyond display content (also called disable content range) of the original image data.

Through the above scroll process, the CPU 21 performs the following. After a set of layers for original image data is once stored in a set of planes and is combined into the original image data by the first compositing circuit 13*d* (see S130 to S140), the video capture device 10 records the original image data in the addition plane 22*d* (see S145, S150), and the original image data is cyclically outputted from the video capture device 10 to the first compositing circuit 13*d* (see S270). In, this cyclic output of the original image data, the read address of the recorded original image data is changed in response to the user scroll operation (see S280), and thereby, the display of the original image data on the display device 12 is smoothly scrolled in the overscan mode. In the above, the set of planes is one or more of the planes 22*a* to 22*c*, the number of planes in the set is N.

Therefore, the CPU 21 needs not to generate and store another image in the planes 22*a* to 22*c* every time the scroll operation is conducted. Thus the amount of data to be read from the RAM 22 is decreased, and the processing load of the CPU 21 is decreased.

Even a layer lager than the display screen of the display device 12 is stored in a plane as is illustrated in the present embodiment, the layer should be constantly retained in the plane during the scrolling of display within the display content of the layer. After the needs to scroll the display beyond the display content of the layer occur, a next (another) layer is stored. In this case, however, it may be too late to store the next layer.

In view of the above the present embodiment may employ the following configuration, taking into account the non-use of the planes 22*a* to 22*c* for the display on the display device 12 during the loop-output of the original image data from the video capture device 10 in the scroll process. During the loop-output of the original image data from the video capture device 10, that is, during the user scroll operation, the CPU 21 may prospectively store a second set of layers for new image data in a second set of planes (one or more of the planes 22*a* to 22*c*). The new image data is different in display content from the original image data in that the display content of the new image data is slid relative to that of the original image data. Then, just before the display is scrolled beyond the display content (i.e., the display object range) of the original image data, the loop 280 may be ended, and the scroll process may be performed again from S145. In this way, it is possible to promptly continue the scroll process by using a new image made by the first compositing circuit 13*d* from the set of layers prospectively stored in the planes 22*a* to 22*c*.

Third Embodiment

A third embodiment will be described below.

In addition to the operations described in the first and second embodiments, the navigation apparatus 1 for a vehicle of the present embodiment is configured to perform an operation to keep the display on the display device 12 normal during reset of the plane compositing device 13.

Figure 16:
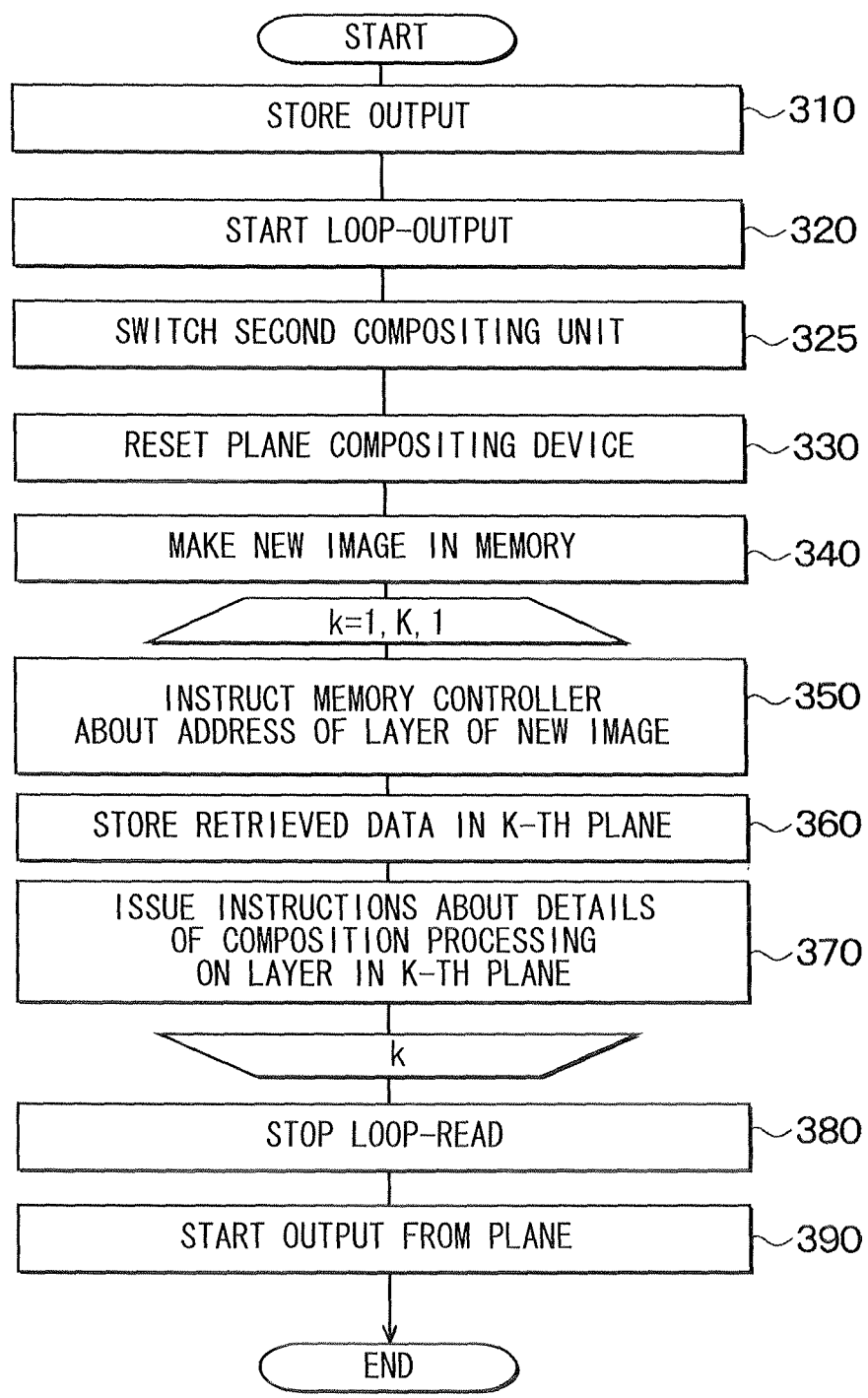
FIG. 16 is a flowchart illustrating a reset process.

To do so, the CPU 21 of the present embodiment performs a rest process illustrated in the FIG. 16 in resetting the plane compositing device 13. In a case of instant reset, the CPU 21 implements the reset process by, executing a predetermined program.

At the start of the reset process, the second compositing circuit 13*e* receives the image data from the first compositing circuit 13*d* and outputs the received image data to the display, device 12 with no change as usual.

At S310, the CPU 21 controls the video capture device 10 so that the video capture device 10 records, in the addition plane 22*d* of the RAM 22, the image data outputted from the second compositing circuit 13*e*.

More specifically, the CPU 21 instructs the memory controller 10*e* of the video capture device 10 to record certain image data as reset-time image data in the RAM 22. In the above, the certain image data is the image data that the format conversion unit 10*b* receives from the second compositing circuit 13*e* during a period from a predetermined start time to a predetermined end time. The predetermined start time is a time when the second compositing circuit 13*e* starts outputting image data for a next frame. The predetermined end time is a time when the second compositing circuit 13*e* ends outputting the image data for a next frame. Due to the above-described control, the memory controller 10*e* records the image data for a next layer as the reset-time image data in the addition plane 22*d*.

After the recording of the reset-time image data is completed, the process proceeds to S320. At S320, the CPU 21 controls the video capture device 10 so that the video capture device 10 starts loop-outputting the reset-time image data to the first compositing circuit 13*d* and the second compositing circuit 13*e*. A specific manner of the above control at S320 is the substantially same as that at S170 in the first embodiment.

At S325, the CPU 21 controls and switches the second compositing circuit 13*e* (which can act as a hardware switch circuit as described above) into the second state where the output signal from the video adjust unit 10*d* of the video capture device 10 is, directly outputted to the display device 12 via the second compositing circuit 13*e*.

At S330, the CPU 21 outputs a reset signal to the plane compositing device 13 to reset the plane compositing device 13. When the plane compositing device 13 receives the reset signal, the plane compositing device 13 is reset. During the reset, the scaling units 13*a* to 13*c*, the memory controller 13*f* and the first compositing circuit 13*d* cannot perform a normal operation. Thus, during this reset, if the data outputted from the first compositing circuit 13*d* is directly outputted to the display device 12 via the second compositing circuit 13*e*, the display of the display device 12 becomes abnormal. Since a period from the start and end of the reset typically corresponds to a few frames to a few dozen frames, if the display on the display device 12 is abnormal during this period a user may get an idea from the abnormal display that the display device 12 is in trouble.

In the present embodiment, just before the reset of the plane compositing device 13, the second compositing circuit 13*e* is controlled and switched into the second state where the output signal from the video adjust unit 10*d* is directly outputted to the display device 12 and the output signal from each of the scaling units 13*a* to 13*c* is not outputted to the display device 12. Therefore, a output signal from the scaling unit 13*a* to 13*c* is prohibited from being inputted to the display device 12.

During the reset, the memory controller 10*e* cyclically reads the reset-time image data from the RAM 22 and outputs the reset-time image data to the scaling unit 10*c*, and the scaling unit 10*c* cyclically outputs the received reset-time image data to the video adjust unit 10*d*, and the video adjust unit 10*d* cyclically outputs the received reset-time image data to the second compositing circuit 13*e*.

In this way, the second compositing circuit 13*e* cyclically outputs the reset-time image data to the display device 12. As a result, the display device 12 continues to display the rest-time image data during the reset of the plane compositing device 13. Then, at S340, the CPU 21 generates a set of layer for new image data in a portion of the memory area of the RAM 22 other then the planes. In the above, the new image data is image data to be displayed after the completion of the reset.

The CPU 21 waits until a predetermined time of period has elapsed since the reset signal was outputted at S330. The predetermined time is preset lager than the period from the start of the reset to the end of the reset. When the predetermined time has elapsed, a loop S350 to S370 is performed K times while "k" is increased from 1 to K in increments of 1. In the above, K is equal to the number of layers used to generate the new image data, and thus is less than or equal to the number of scaling units 13a to 13c.

Processing details of S350, S360 and S370 can be the substantially same as the processing details of S130, S135 and S140 when "original image" in S130, 135 and S140 is replaced with "new image". Because of the performing of the loop S350 to S370 K times, the layers for use in making the new image data are respectively stored in the planes 22a to 22c now, and the scaling units 13a to 13c are ready to combine these layers to make the new image data.

At S380, the CPU 21 controls the memory controller 10e of the video capture device 10 so that the loop-output of the reset-time image data which was started at S320, is stopped.

At S390, the CPU 21 controls the plane compositing device 13 so that the new image data is outputted to the display device 12. More specifically, the CPU 21 controls the scaling units 13a to 13c so that the scaling units 13a to 13c respectively read the layers for the new image data, which are stored in the planes 22a to 22c in association with the scaling units 13a to 13c, and the scaling units 13a to 13c output the layers to the first compositing circuit 13d. Further, the CPU 21 controls the first compositing circuit 13d so that the first compositing circuit 13d combines the layers for the new image data, which are outputted from the scaling units 13a to 13c, into the new image data, and the first compositing circuit 13d outputs the new image data to the second compositing circuit 13e. Further, the CPU 21 controls and switches the second compositing circuit 13e into the first state where the output signal from the first compositing circuit 13d is directly outputted to the display device 12 via the second compositing circuit 13e. After S390, the reset process is ended.

According to the navigation apparatus 1 of the present embodiment, even when the plane compositing device 13 is reset, the reset-time image data continues to be outputted to the display device 12 during the reset. Since the reset-time image data is image data that was outputted to the display device 12 just before the reset, a user perceives that an already-displayed image continues to be displayed during the reset of the plane compositing device 13. Therefore, it is unlikely that a user has a feeling of strangeness by seeing the reset-time image data, and it is possible to reduce a possibility that a user gets an idea that the display device 12 is in trouble.

In the first, second and present embodiments, the first compositing circuit 13d and the second compositing circuit 13e can act as an example of a compositing circuit. The scaling unit 10c, the video adjust unit 10d, and the memory controller 10e can act as a loop-back circuit. The CPU 21 can act as an example of a computation circuit. The RAM 22 can act as an example of a storage medium.

(Modifications)

The above embodiments can be modified in various ways, examples of which are described below.

In the above embodiments, the first compositing circuit 13d combines multiple layers into original image data and the original image data is outputted to the video capture device and recorded. Then, for subsequent multiple frames, the recorded original image data is cyclically returned from the video capture device 10 to the first compositing circuit 13d. In this way, the need to make the original image data from the layers again is eliminated. It should be noted that a configuration other than the video capture device 10 may be used to enable the loop-back of the original image in the above manner.

For example, a pair of a plane and a scaling unit may be used to enable the loop-back of the original image data. Specifically, an addition scaling unit corresponding to the addition plane 22d is further provided. The original image data, which is made by image composition based on the layers stored in the planes 22a to 22c, is stored in the addition plane 22d. Then, the CPU 21 controls the addition scaling unit so that the addition scaling unit reads the original image data from the addition planes 22d, performs the size-reduction processing on the original image data if necessary, and outputs the original image data to the first compositing circuit 13d. The above configuration can also eliminate the need to make the original image data from the layers again, and can reduce the processing load of the CPU and the amount of data to be read from the RAM 22. To apply this alternative configuration to the first or second embodiment, the addition scaling unit may be provided inside or outside the plane compositing device 13. To apply this alternative configuration to the third embodiment, the addition scaling unit may be provided outside the plane compositing device 13, so that the addition scaling unit can operate without being influenced by the reset of the plane compositing device 13.

In the above embodiments, the scaling units 13a to 13c of the plane compositing device 13 respectively read the layers from the counterpart planes 22a to 22c, perform the scaling processing (e.g., size-enlargement, size-reduction or the like) on the layers on an as-needed basis, and outputs the layers. However, the scaling units 13a to 13c may not have a function to perform the scaling processing. Even if the scaling units 13a to 13c do not have a function to perform the scaling processing, it is possible to switch the display with the crossfade by controlling the first compositing circuit 13d in respect of the blend ratio. Therefore, the scaling units 13a to 13c may suffice as long as the scaling units 13a to 13c is implemented as interface units respectively configured to outputs the layers, which are stored the multiple planes 22a, to the compositing circuit 13d, 13e. The interface units may or may not have the function to perform the scaling processing.

Likewise even if the scaling unit 10c of the video capture device 10 does have a function to perform scaling processing on image data (e.g., enlarge or downsize image data), it is possible to switch the display with the crossfade by controlling the first compositing circuit 13d in respect of the blend ratio. Therefore, the scaling unit 10c may suffice as long as the scaling unit 10c is implemented as a loop-back circuit configured to output the image data stored in the addition plane 22d to the compositing circuit 13d, 13e. The loop-back circuit may or may not have the function to perform the scaling processing.

The above-described processes or steps, which are implemented by the CPU 21 executing a program in the above embodiments may be implemented by hardware (e.g., a Field-Programmable Gate Array, a configuration of which is programmable). In this case, the hardware can act as an example of the computation circuit.

In the above embodiment, the navigation apparatus 1 for a vehicle is described as an example of an image display control apparatus. However, the image display control apparatus is not limited to an in-vehicle apparatus. For example, the image display control apparatus may be a portable apparatus (e.g., cellular phone), which is carried by a user.

While the invention has been described above with reference to various embodiments thereof, it is to be understood that the invention is not limited to the above described embodiments and construction. The invention is intended to cover various modification and equivalent arrangements. In addition while the various combinations and configurations described above are contemplated as embodying the invention, other combinations and configurations, including more, less or only a single element, are also contemplated as being within the scope of embodiment.

What is claimed is:

1. An image display control apparatus comprising:
a computation circuit;
a storage medium; and
a plane compositing device configured to combine a plurality of layers into composite image data on an as-needed basis, and configured to output the composite image data as display image data to a display device, wherein the plurality of layers is generated by the computation circuit,
wherein:
the storage medium includes a plurality of planes respectively configured to temporarily store therein the plurality of layers, the plurality of planes being a portion of a memory area of the storage medium;
the plane compositing device includes a plurality of interface units and a compositing circuit;
the plurality of interface units are respectively configured to output the plurality of layers stored in the plurality of planes, which respectively correspond to the plurality of interface units, to the compositing circuit;
the compositing circuit is configured to (i) combine the plurality of layers outputted from the plurality of interface units, thereby generating the composite image data, and (ii) output the composite image data as the display image data to the display device; and
in addition to the plurality of planes, the storage medium further includes an addition plane configured to store therein the composite image data outputted from the compositing circuit, the addition plane being another portion of the memory area of the storage medium,
the image display control apparatus further comprising:
a loop-back circuit configured to output the composite image data stored in the addition plane to the compositing circuit,
wherein:
the computation circuit is configured to control the storage medium, the plane compositing device and the loop-back circuit when display of the display device is switched, from the original image data to the replacement image data, in such manner that:
the computation circuit stores a first set of layers for original image data in a first set of planes, the first set of planes being two or more planes of the plurality of planes;
the computation circuit then causes the compositing circuit to combine the first set of layers together, thereby generating the original image data;
the computation circuit then loops-back the generated original image data and stores the original image data in the addition plane;
the computation circuit then stores a second set of layers for replacement image data in a second set of planes, the second set of planes being two or more planes of the plurality of planes;
the computation circuit then controls the plurality of interface units and the loop-back circuit so that the second set of layers in the second set of planes and the original image data in the addition plane are synchronously and cyclically inputted to the compositing circuit; and
when the second set of layers in the second set of planes and the original image data in the addition plane are being synchronously and cyclically inputted to the compositing circuit, the computation circuit controls the compositing circuit to (i) combine the second set of layers into the replacement image data and (ii) combine the original image data and the replacement image data, so that the display of the display device is switched from the original image data to the replacement image data while a manner of combining the original image data and the replacement image data is being gradually changed between consecutive frames.

2. The image display control apparatus according to claim 1, further comprising:
a video capture device configured to receive an input of a video signal from a video output device, and configured to output video image data based on the video signal,
wherein the loop-back circuit is a component of the video capture device and is further configured to output the video image data, which is based on the video signal received by the video capture device, to the plane compositing device.

3. The image display control apparatus of claim 1, wherein the display of the device is switched between the original image to the replacement image when display of the display device is switched between map image and menu image in response to a user operation.

4. The image display control apparatus of claim 1, wherein the display of the device is switched between different scenes corresponding to the original image and the replacement image.

5. An image display control apparatus comprising:
a computation circuit;
a storage medium; and
a plane compositing device configured to combine a plurality of layers into composite image data on an as-needed basis, and configured to output the composite image data as display image data to a display device, wherein the plurality of layers is generated by the computation circuit,
wherein:
the storage medium includes a plurality of planes respectively configured to temporarily store therein the plurality of layers, the plurality of planes being a portion of a memory area of the storage medium;
the plane compositing device includes a plurality of interface units and a compositing circuit; the plurality of interface units are respectively configured to output the plurality of layers stored in the plurality of planes, which respectively correspond to the plurality of interface units, to the compositing circuit;
the compositing circuit is configured to (i) combine the plurality of layers outputted from the plurality of interface units, thereby generating the composite image data, and (ii) output the composite image data as the display image data to the display device; and
in addition to the plurality of planes, the storage medium further includes an addition plane configured to store therein the composite image data outputted from the compositing circuit, the addition plane being another portion of the memory area of the storage medium,
the image display control apparatus further comprising:

a loop-back circuit configured to output the composite image data stored in the addition plane to the compositing circuit, wherein:

the computation circuit is configured to control the storage medium, the plane compositing device and the loop-back circuit when display of the display device is scrolled, in such manner that:

the computation circuit stores a first set of layers for original image data in a first set of planes, the first set of planes being two or more planes of the plurality of planes;

the computation circuit then causes the compositing circuit to combine the first set of layers together, thereby generating the original image data;

the computation circuit then loops-back the original image data and stores the original image data in the addition plane; the computation circuit controls the loop-back circuit so that the loop-back circuit synchronously and cyclically inputs the original image data in the addition plane to the compositing circuit; and during a cyclical input of the original image data to the compositing circuit, the computation circuit changes a read address of the original image data stored in the addition plane in response to user scroll operation, thereby scrolling display of the original image data on the display device in an overscan mode.

6. The image display control apparatus according to claim 5, wherein:

the computation circuit is further configured to control the storage medium, the plane compositing device and the loop-back circuit so that:

during the synchronous and cyclical input of the original image data to the compositing circuit from the loop-back circuit, the computation circuit prospectively stores a second set of layers for new image data in a second set of planes, the second set of planes being at least one of the plurality of planes, the new image data being different in display content from the original image data in that the display content of the new image data is slid relative to that of the original image data;

before the display of the display device is scrolled beyond the display content of the original image data, the compositing circuit combines the second set of layers into the new image data, and the loop-back circuit records the new image data in the addition plane, and the loop-back circuit cyclically inputs the new image data, stored in the addition plane, to the compositing circuit; and during a cyclical input of the new image data from the loop-back circuit to the compositing circuit, the computation circuit changes a read address of the new image data recorded in the addition plane in response to the user scroll operation, thereby scrolling the display of the new image data on the display device in the overscan mode.

7. The image display control apparatus according to claim 5, further comprising:

a video capture device configured to receive an input of a video signal from a video output device, and configured to output video image data based on the video signal, wherein the loop-back circuit is a component of the video capture device and is further configured to output the video image data, which is based on the video signal received by the video capture device to the plane compositing device.

8. An image display control apparatus comprising:

a computation circuit;

a storage medium; and a plane compositing device configured to combine a plurality of layers into composite image data on an as-needed basis and configured to output the composite image data as display image data to a display device, wherein the plurality of layers is generated by the computation circuit, wherein:

the storage medium includes a plurality of planes respectively configured to temporarily store therein the plurality of layers, the plurality of planes being a portion of a memory area of the storage medium;

the plane compositing device includes a plurality of interface units and a compositing circuit;

the plurality of interface units are respectively configured to output the plurality of layers stored in the plurality of planes, which respectively correspond to the plurality of interface units, to the compositing circuit;

the compositing circuit is configured to (i) combine the plurality of layers outputted from the plurality of interface units, thereby generating the composite image data, and (ii) output the composite image data as the display image data to the display device; and in addition to the plurality of planes, the storage medium further includes an addition plane configured to store therein the composite image data outputted from the compositing circuit, the addition plane being another portion of the memory area of the storage medium, the image display control apparatus further comprising:

a loop-back circuit configured to output the composite image data stored in the addition plane to the compositing circuit, wherein:

when the plane compositing device is to be reset, the computation circuit is configured to control the storage medium, the plane compositing device and the loop-back circuit in such a manner that:

before the plane compositing device is reset, (i) the composite image data outputted from the compositing circuit is stored as reset-time image data in the addition plane, and then (ii) the loop-back circuit starts cyclically outputting the reset-time image data to the compositing circuit, and (iii) the compositing circuit outputs, to the display device, the reset-time image data from the loop-back circuit; and the computation circuit then resets the plane compositing device.

9. The image display control apparatus according to claim 8, further comprising:

a video capture device configured to receive an input of a video signal from a video output device, and configured to output video image data based on the video signal, wherein the loop-back circuit is a component of the video capture device and is further configured to output the video image data, which is based on the video signal received by the video capture device, to the plane compositing device.

* * * * *